(12) United States Patent
Umemura

(10) Patent No.: US 8,843,715 B2
(45) Date of Patent: *Sep. 23, 2014

(54) SYSTEM MANAGING A PLURALITY OF VIRTUAL VOLUMES AND A VIRTUAL VOLUME MANAGEMENT METHOD FOR THE SYSTEM

(75) Inventor: Shoko Umemura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,035

(22) Filed: Jan. 27, 2012

(65) Prior Publication Data

US 2012/0124331 A1 May 17, 2012

Related U.S. Application Data

(63) Continuation of application No. 12/908,450, filed on Oct. 20, 2010, now Pat. No. 8,122,214, which is a continuation of application No. 12/477,381, filed on Jun. 3, 2009, now Pat. No. 7,840,767, which is a continuation of application No. 11/767,116, filed on Jun. 22, 2007, now Pat. No. 7,565,502, which is a continuation of application No. 11/431,828, filed on May 11, 2006, now Pat. No. 7,290,103, which is a continuation of application No. 10/971,147, filed on Oct. 25, 2004, now Pat. No. 7,139,888.

(30) Foreign Application Priority Data

Aug. 30, 2004 (JP) ................................ 2004-249459

(51) Int. Cl.
*G06F 12/00* (2006.01)
*G06F 3/06* (2006.01)
*G06F 11/20* (2006.01)

(52) U.S. Cl.
CPC ............ *G06F 3/0632* (2013.01); *G06F 3/0605* (2013.01); *G06F 3/0665* (2013.01); *G06F 3/0635* (2013.01); *G06F 3/061* (2013.01); *G06F 3/067* (2013.01); *G06F 3/0607* (2013.01); *G06F 11/2071* (2013.01); *G06F 11/2069* (2013.01); *G06F 3/065* (2013.01); *G06F 3/0659* (2013.01)

USPC ........... 711/162; 711/100; 711/114; 711/154; 711/161; 711/165; 711/E12.001; 711/E12.103

(58) Field of Classification Search
USPC ................. 711/100, 114, 154, 161–162, 165, 711/E12.001, E12.103
See application file for complete search history.

(56) References Cited

U.S. PATENT DOCUMENTS 3,771,137 A    11/1973   Barner et al.
4,025,904 A     5/1977   Adney et al.
(Continued)

FOREIGN PATENT DOCUMENTS

EP    0670551 A1    9/1995
EP    1 357 465     10/2003
(Continued)

OTHER PUBLICATIONS

Meggyesi "Fibre Channel Overview," High Speed Interconnect project European Laboratory of Particle Physics (CERN) web page http://hsi.web.cern.ch (Aug. 1994).

(Continued)

*Primary Examiner* — Jasmine Song
(74) *Attorney, Agent, or Firm* — Mattingly & Malur, PC

(57) ABSTRACT

The system includes first and second storage systems. The first storage system includes a first control unit managing a plurality of logical units (LUs) and a plurality of first storage devices being controlled to store data by the first control unit, the plurality of LUs including a first type LU and a second type LU, the first type LU corresponding to at least one of the plurality of first storage devices of the first storage system so that data to be stored to the first type LU is stored to the at least one of the plurality of first storage devices of the first storage system, the second type LU mapping to an LU which is managed by a second storage system so that data to be stored to the second type LU is transferred to the LU managed by the second storage system.

14 Claims, 20 Drawing Sheets

(56) References Cited

U.S. PATENT DOCUMENTS

| | | | |
|---|---|---|---|
| 4,710,868 A | 12/1987 | Cocke et al. |
| 5,155,845 A | 10/1992 | Beal et al. |
| 5,408,465 A | 4/1995 | Gusella et al. |
| 5,459,857 A | 10/1995 | Ludlam et al. |
| 5,504,882 A | 4/1996 | Chai et al. |
| 5,548,712 A | 8/1996 | Larson et al. |
| 5,680,580 A | 10/1997 | Beardsley et al. |
| 5,680,640 A | 10/1997 | Ofek et al. |
| 5,758,118 A | 5/1998 | Choy et al. |
| 5,809,285 A | 9/1998 | Hilland |
| 5,835,954 A | 11/1998 | Duyanovich et al. |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,044,444 A | 3/2000 | Ofek |
| 6,098,129 A | 8/2000 | Fukuzawa et al. |
| 6,101,497 A | 8/2000 | Ofek |
| 6,108,748 A | 8/2000 | Ofek et al. |
| 6,173,374 B1 | 1/2001 | Heil et al. |
| 6,195,730 B1 | 2/2001 | West |
| 6,209,002 B1 | 3/2001 | Gagne et al. |
| 6,219,753 B1 | 4/2001 | Richardson |
| 6,230,239 B1 | 5/2001 | Sakaki et al. |
| 6,240,486 B1 | 5/2001 | Ofek et al. |
| 6,240,494 B1 | 5/2001 | Nagasawa et al. |
| 6,247,099 B1 | 6/2001 | Skazinski et al. |
| 6,247,103 B1 | 6/2001 | Kern et al. |
| 6,253,295 B1 | 6/2001 | Beal et al. |
| RE37,305 E | 7/2001 | Chang et al. |
| 6,341,329 B1 | 1/2002 | LeCrone et al. |
| 6,356,977 B2 | 3/2002 | Ofek et al. |
| 6,363,462 B1 | 3/2002 | Bergsten et al. |
| 6,446,141 B1 | 9/2002 | Nolan et al. |
| 6,446,175 B1 | 9/2002 | West et al. |
| 6,453,354 B1 | 9/2002 | Jiang et al. |
| 6,457,109 B1 | 9/2002 | Milillo et al. |
| 6,457,139 B1 | 9/2002 | D'Errico et al. |
| 6,480,934 B1 | 11/2002 | Hino et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,560,673 B2 | 5/2003 | Elliot |
| 6,587,935 B2 | 7/2003 | Ofek |
| 6,598,134 B2 | 7/2003 | Ofek et al. |
| 6,622,220 B2 | 9/2003 | Yoshida et al. |
| 6,640,278 B1 | 10/2003 | Nolan et al. |
| 6,640,291 B2 | 10/2003 | Fujibayashi |
| 6,647,387 B1 | 11/2003 | McKean et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,675,268 B1 | 1/2004 | DeKonig et al. |
| 6,681,303 B1 | 1/2004 | Watabe et al. |
| 6,681,339 B2 | 1/2004 | McKean et al. |
| 6,684,310 B2 | 1/2004 | Anzai et al. |
| 6,697,367 B1 | 2/2004 | Halstead et al. |
| 6,708,232 B2 | 3/2004 | Obara |
| 6,718,404 B2 | 4/2004 | Reuter et al. |
| 6,745,281 B1 | 6/2004 | Saegusa |
| 6,772,315 B1 | 8/2004 | Perego |
| 6,799,255 B1 | 9/2004 | Blumenau |
| 6,816,948 B2 | 11/2004 | Kitamura et al. |
| 6,826,778 B2 | 11/2004 | Bopardikar et al. |
| 6,851,020 B2 | 2/2005 | Matsumoto et al. |
| 6,857,057 B2 | 2/2005 | Nelson et al. |
| 6,876,656 B2 | 4/2005 | Brewer et al. |
| 6,883,064 B2 | 4/2005 | Yoshida et al. |
| 6,922,761 B2 | 7/2005 | O'Connell et al. |
| 6,973,549 B1 | 12/2005 | Testardi et al. |
| 6,976,103 B1 | 12/2005 | Watanabe et al. |
| 6,976,134 B1 | 12/2005 | Lolayekar et al. |
| 7,010,663 B2 | 3/2006 | George et al. |
| 7,031,975 B2 | 4/2006 | Kanie |
| 7,089,359 B2 * | 8/2006 | Kaneda et al. ................ 711/117 |
| 7,111,138 B2 | 9/2006 | Higaki et al. |
| 7,127,445 B2 | 10/2006 | Mogi et al. |
| 7,143,262 B2 | 11/2006 | Serizawa |
| 7,386,598 B2 | 6/2008 | Mannen et al. |
| 2001/0050915 A1 | 12/2001 | Ohare et al. |
| 2001/0052018 A1 | 12/2001 | Yokokura |
| 2002/0004857 A1 | 1/2002 | Arakawa et al. |
| 2002/0004890 A1 | 1/2002 | Ofek et al. |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0065864 A1 | 5/2002 | Hartsell et al. |
| 2002/0087544 A1 | 7/2002 | Selkirk et al. |
| 2002/0087751 A1 | 7/2002 | Chong |
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178328 A1 | 11/2002 | Honda et al. |
| 2002/0178335 A1 | 11/2002 | Selkirk et al. |
| 2002/0188592 A1 | 12/2002 | Leonhardt et al. |
| 2002/0194428 A1 | 12/2002 | Green |
| 2002/0194523 A1 | 12/2002 | Ulrich et al. |
| 2003/0037071 A1 | 2/2003 | Harris et al. |
| 2003/0051109 A1 | 3/2003 | Cochran |
| 2003/0056038 A1 | 3/2003 | Cochran |
| 2003/0079018 A1 | 4/2003 | Lolayekar et al. |
| 2003/0079019 A1 | 4/2003 | Lolayekar et al. |
| 2003/0093541 A1 | 5/2003 | Lolayekar et al. |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0105931 A1 | 6/2003 | Weber et al. |
| 2003/0115218 A1 | 6/2003 | Bobbitt et al. |
| 2003/0115432 A1 | 6/2003 | Biessener et al. |
| 2003/0126327 A1 | 7/2003 | Pesola et al. |
| 2003/0131182 A1 | 7/2003 | Kumar et al. |
| 2003/0145168 A1 | 7/2003 | LeCrone et al. |
| 2003/0145169 A1 | 7/2003 | Nagasawa |
| 2003/0149848 A1 | 8/2003 | Ibrahim et al. |
| 2003/0158999 A1 | 8/2003 | Hauck et al. |
| 2003/0163553 A1 | 8/2003 | Kitamura et al. |
| 2003/0167419 A1 | 9/2003 | Yanai et al. |
| 2003/0182525 A1 | 9/2003 | O'Connell |
| 2003/0189936 A1 | 10/2003 | Terrell et al. |
| 2003/0200387 A1 | 10/2003 | Urabe et al. |
| 2003/0200487 A1 | 10/2003 | Taninaka et al. |
| 2003/0204597 A1 | 10/2003 | Arakawa et al. |
| 2003/0204700 A1 | 10/2003 | Biessener et al. |
| 2003/0208614 A1 | 11/2003 | Wilkes |
| 2003/0212854 A1 | 11/2003 | Kitamura et al. |
| 2003/0212860 A1 | 11/2003 | Jiang et al. |
| 2003/0221077 A1 | 11/2003 | Ohno et al. |
| 2003/0229645 A1 | 12/2003 | Mogi et al. |
| 2003/0229764 A1 | 12/2003 | Ohno et al. |
| 2004/0003022 A1 | 1/2004 | Garrison et al. |
| 2004/0028043 A1 | 2/2004 | Maveli et al. |
| 2004/0049553 A1 | 3/2004 | Iwamura et al. |
| 2004/0054850 A1 | 3/2004 | Fisk et al. |
| 2004/0054866 A1 | 3/2004 | Blumenau et al. |
| 2004/0064610 A1 | 4/2004 | Fukuzawa et al. |
| 2004/0064641 A1 | 4/2004 | Kodama |
| 2004/0068637 A1 | 4/2004 | Nelson |
| 2004/0073831 A1 | 4/2004 | Yanai et al. |
| 2004/0088538 A1 | 5/2004 | Isip et al. |
| 2004/0088574 A1 | 5/2004 | Walter et al. |
| 2004/0098547 A1 | 5/2004 | Ofek et al. |

(56) References Cited

U.S. PATENT DOCUMENTS

| | | |
|---|---|---|
| 2004/0103261 A1 | 5/2004 | Honda et al. |
| 2004/0107315 A1 | 6/2004 | Watanabe et al. |
| 2004/0111485 A1 | 6/2004 | Mimatsu et al. |
| 2004/0117585 A1 | 6/2004 | Glider |
| 2004/0123180 A1 | 6/2004 | Soejima et al. |
| 2004/0143832 A1 | 7/2004 | Yamamoto et al. |
| 2004/0148443 A1 | 7/2004 | Achiwa |
| 2004/0158652 A1 | 8/2004 | Obara |
| 2004/0158673 A1 | 8/2004 | Matsunami et al. |
| 2004/0172510 A1 | 9/2004 | Nagashima et al. |
| 2004/0230980 A1 | 11/2004 | Koyama et al. |
| 2004/0260875 A1 | 12/2004 | Murotani et al. |
| 2004/0260966 A1 | 12/2004 | Kaiya et al. |
| 2005/0010734 A1 | 1/2005 | Soejima et al. |
| 2005/0010743 A1 | 1/2005 | Tremblay et al. |
| 2005/0033878 A1 | 2/2005 | Pangal et al. |
| 2005/0055501 A1 | 3/2005 | Guha et al. |
| 2005/0060506 A1* | 3/2005 | Higaki et al. ............... 711/162 |
| 2005/0071559 A1* | 3/2005 | Tamura et al. ............... 711/117 |
| 2005/0081009 A1 | 4/2005 | Williams et al. |
| 2005/0138184 A1 | 6/2005 | Amir et al. |

FOREIGN PATENT DOCUMENTS

| | | |
|---|---|---|
| EP | 1 357 476 | 10/2003 |
| JP | 09-288547 | 11/1997 |
| JP | 10-508967 | 9/1998 |
| JP | 10-283272 A | 10/1998 |
| JP | 11-085980 A | 3/1999 |
| JP | 2000-293317 | 10/2000 |
| JP | 2000-293317 A | 10/2000 |
| JP | 2001-067187 A | 3/2001 |
| JP | 2001-087187 | 3/2001 |
| JP | 2002-157091 | 5/2002 |
| JP | 2002-157091 A | 5/2002 |
| JP | 2002-230246 | 8/2002 |
| JP | 2002-230246 A | 8/2002 |
| JP | 2003-157152 | 5/2003 |
| JP | 2003-316616 | 11/2003 |
| JP | 2004-13454 | 1/2004 |
| JP | 2004-164370 | 6/2004 |
| WO | WO 97/09676 | 3/1997 |
| WO | WO03/023640 | 3/2003 |
| WO | WO 03/027886 A1 | 4/2003 |
| WO | WO 03/030431 A2 | 4/2003 |
| WO | WO 03/030449 A1 | 4/2003 |

OTHER PUBLICATIONS

"Celerra Data Migration Service (CDMS)," White Paper, EMC Corporation Hopkinton, MA (Jan. 2002).

"Data Migration Solution Transferring Data Between Storage Systems over Fibre-channel or SCSI Connections," SANRAD Application Note: APP-003-03, SANRAD Inc. San Mateo, CA (2003).

"Migrating Individual Servers to an ISCSI SAN," SANRAD Application Note:APP-004-0 1, SANRAD Inc. San Mateo, CA (2003).

"Network Attached Storage in the Data Protection Environment," Sony Electronics Inc. (Feb. 2002).

Anderson et al. "Hippodrome: Running Circles Around Storage Administration," Proceedings of the 1st USENIX Conference on File and Storage Technologies (Jan. 2002).

Sarkar et at. "Internet Protocol storage area networks." IBM Systems Journal 42: 218-231 (2003).

Sicola "SCSI-3 Fault Tolerant Controller Configurations Utilizing SCC & New Event Codes." T10 Committee of the International Committee on Information Technology Standards (INCITS), X3T10 95 (Oct. 1995).

* cited by examiner

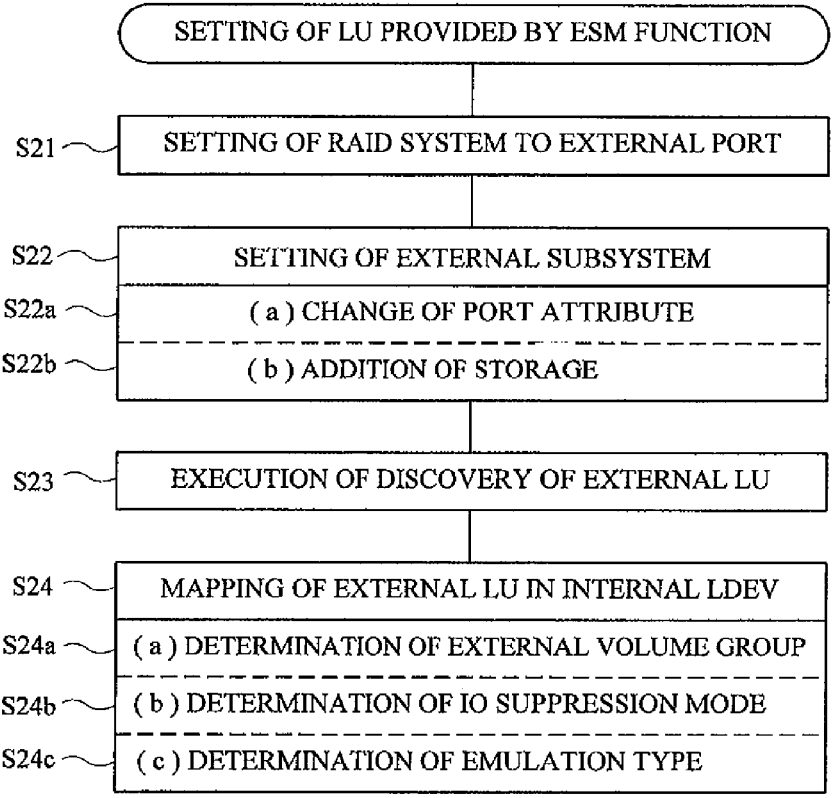

FIG. 10

- Logical Groups
- All Storage
- Subsystems
  - RAID-S@10.10.10.10
    - ALLOCATION
    - NON-ALLOCATION
- Hosts

622

SELECTION OF STORAGE SUBSYSTEM

STORAGE SUBSYSTEM

| SUBSYSTEM NAME | RAID-S@10. 10. 10. 10 |
|---|---|
| NUMBER OF LDEVs | 450 |
| ALLOCATION CAPACITY | 1.1TB |

OBJECT LIST

| LDEV | Port/HSD/LUN | Host | EMU type | Capacity | ... | Location |
|---|---|---|---|---|---|---|
| ● 0:35 | CL1-A/1A-G00/13 | Host_A | OPEN-V | 2.5 GB | | Internal |
| ☐ 0:01 | CL1-A/HCMD0029/01 | Host_B | OPEN-3x2 | 3.7 GB | | SANR-S@10.20.30.40 |
| ☐ 0:02 | CL1-A/HCMD001/00 | Host_C | OPEN-3 | 6.5 GB | | Internal |
| ☐ 0:03 | CL1-M/1A-G00/00 | Host_D | OPEN-E | 4 GB | | SANR-S@20.30.40.50 |

[PAIR CREATION] [PAIR CHANGE] [PAIR DELETION] [PAIR DISPLAY]

FIG. 12

PAIR CREATION SCREEN...SVOL SELECTION

PVOL INFORMATION : ...

COPY TYPE : ShadowImage

LDEV LIST

| LDEV | Subsystem | Port | EMU type | Capacity | Location |
|---|---|---|---|---|---|
| ● 0:45 | SATA-S@20.20.20.20 | CL1-B | OPEN-V | 2.5 GB | SATA-S@20.20.20.20 |
| ☐ 0:2A | SANR-S@11.12.13.14 | CL1-C | OPEN-E | 3.7 GB | SANR-S@11.12.13.14 |
| ☐ B:02 | RAID-S@10.10.10.10 | CL1-D | OPEN-3x2 | 6.5 GB | Internal |
| ☐ 0:03 | RAID-S@10.10.10.10 | CL1-E | OPEN-3 | 4 GB | Internal |

[Next]  [Back]  [Cancel]

| PAIR CREATION COMPLETION | | | | | | |
|---|---|---|---|---|---|---|
| Copy Type : Shadow Image | | | | | | |
| Action | Copy Type | ・・・ | LDEV | Subsystem | PVOL | SVOL |
| Add | SI | | 35 | RAID-S@10.10.10.10 | ○ | |
| | | | 45 | SATA-S@20.20.20.20 | | ○ |

PAIR CREATION IS COMPLETED.

[End] [More]

622

SYSTEM MANAGING A PLURALITY OF VIRTUAL VOLUMES AND A VIRTUAL VOLUME MANAGEMENT METHOD FOR THE SYSTEM

CROSS-REFERENCE TO RELATED APPLICATIONS

This application is a continuation application of application Ser. No. 12/908,450, filed Oct. 20, 2010, which is a continuation application of application Ser. No. 12/477,381, filed Jun. 3, 2009 (now U.S. Pat. No. 7,840,767), which is a continuation application of Ser. No. 11/767,116, filed Jun. 22, 2007 (now U.S. Pat. No. 7,565,502), which is a continuation of application Ser. No. 11/431,828, filed May 11, 2006 (now U.S. Pat. No. 7,290,103), which, in turn, is a continuation of application Ser. No. 10/971,147, filed Oct. 25, 2004 (now U.S. Pat. No. 7,139,888); which claims priority from Japanese Pat. Appln. JP 2004-249459, filed on Aug. 30, 2004, the entire disclosures of all of the above-identified applications are hereby incorporated by reference.

TECHNICAL FIELD OF THE INVENTION

The present invention relates to a technique for controlling a data processing system and more particularly to a technique effectively applied to the process for establishing a backup operating system using a data management function among plural storages.

BACKGROUND OF THE INVENTION

According to the examination by the inventor of the present invention, the following techniques are known as the control techniques for the conventional data processing systems.

For example, a database system for handling a large amount of data such as a data center adopts such a method that uses a storage system formed separately from its host system to manage data. This storage system is constituted of, for example, a disk array device and the like. The disk array device is constituted by arranging a large number of storage devices in the form of array and is established based on, for example, the redundant arrays of inexpensive disks (RAID). At least one logical volume is set on a physical storage area provided by the storage device group and this logical volume is provided to the host system. The host system is capable of writing or reading data to/from the logical volume by transmitting a predetermined command.

In such a database system, the amount of data managed by the database has been increasing day by day with the development of information society. For this reason, a higher-performance and larger-capacity storage system has been demanded and new storage systems have been developed to meet such a market demand. As a method for introducing a new storage system into a data processing system, for example, there are a method for replacing old storage system with a new storage system so as to constitute the data processing system all based on the new storage system (Published Japanese Translation of PCT Application No. 10-508967) and a method in which the new storage system is added to the data processing system of the old storage system so that the old and new storage systems coexist.

SUMMARY OF THE INVENTION

As a result of the examination by the inventor of the present invention for the control technique of the conventional data processing system described above, the following matters have been made evident.

As for the method for the transition from an old storage system to a new storage system as mentioned above (Published Japanese Translation of PCT Application No. 10-508967), although the function and performance of the new storage system can be utilized, the old storage system cannot be utilized effectively and introduction cost is high. On the other hand, as for the method for achieving coexistence of the old storage system and the new storage system, each storage system needs to prepare its own backup with its own management means, and further, the function of the new storage system is not utilized in the old storage system and the old storage system needs the functional improvement and the resultant cost is required.

Accordingly, an object of the present invention is to provide a technique for controlling a data processing system, in which advanced functions possessed by a new-type, highly-functional and high-performance storage system are achieved in a storage area of the old-type and inexpensive data storage system so as to make an effective use of the existing system and reduce the cost of its entire system.

The above and other objects and novel characteristics of the present invention will be apparent from the description and the accompanying drawings of this specification.

The typical ones of the inventions disclosed in this application will be briefly described as follows.

(1) The first data processing system according to the present invention comprises: a first storage system; a second storage system; a host system for executing data I/O with the first storage system; and a management unit for controlling the first storage system and the second storage system, in which the components are communicably connected among one another through a network, and the first data processing system has following characteristics in the establishment of the backup operating system using an online data copy function in the storage system.

That is, in the first data processing system according to the present invention, the first storage system has a first storage device and a first logical volume and a second logical volume which are set in the first storage device. The second storage system has a second storage device and a third logical volume which is set in the second storage device and mapped in the second logical volume of the first storage system. The management unit includes: an information management table which fetches configuration information of the first storage system and configuration information of the second storage system and stores mapping information of the second logical volume of the first storage system and the third logical volume of the second storage system; and pair creating means for executing the pair creation when performing copy process, in which the first logical volume of the first storage system is set as a primary volume of copy source and the second logical volume of the first storage system mapped from the third logical volume of the second storage system is set as a secondary volume of copy destination by using the information management table.

Further, the first storage system has a connecting function for connecting to the second storage system. The management unit has a management client, a management server, and a management agent each having management means for controlling a control device for issuing a command to the first storage system.

Also, when establishing a backup operating system, the management unit executes a discovery process for the first storage system by means of the management means, a setting process of a logical volume provided by the connecting function with using the management means, a pair creation process in which the first logical volume loaded on the first storage system is set as a primary volume and the second logical volume loaded on the first storage system mapped from the second storage system is set as a secondary volume by using the management means, and a confirmation process for the pair creation with using the GUI of the management client.

(2) The second data processing system according to the present invention comprises: a first storage system; a second storage system; a third storage system; a host system for executing data I/O with the first storage system and the third storage system; and a management unit for controlling the first storage system, the second storage system, and the third storage system, in which the components are communicably connected among one another through a network, and the second data processing system has following characteristics in the establishment of the backup operating system using a remote data copy function between storage systems.

That is, in the second data processing system according to the present invention, the first storage system has a first storage device and a second logical volume set in the first storage device. The second storage system has a second storage device and a third logical volume set in the second storage device and mapped in the second logical volume of the first storage system. The third storage system has a third storage device and a first logical volume set in the third storage device. The management unit includes: an information management table which fetches configuration information of the first storage system, configuration information of the second storage system, and configuration information of the third storage system and stores mapping information of the second logical volume of the first storage system and the third logical volume of the second storage system; and pair creating means for executing the pair creation when performing copy process, in which the first logical volume of the third storage system is set as a primary volume of copy source and the second logical volume of the first storage system mapped from the third logical volume of the second storage system is set as a secondary volume of copy destination by using the information management table.

Further, the first storage system has a connecting function for connecting to the second storage system. The management unit has a management client, a management server, and a management agent each having management means for controlling a control device for issuing a command to the first storage system.

Also, when establishing a backup operating system, the management unit executes a discovery process for the first storage system by means of the management means, a setting process of a logical volume provided by the connecting function with using the management means, a pair creation process in which the first logical volume loaded on the third storage system is set as a primary volume and the second logical volume loaded on the first storage system mapped from the second storage system is set as a secondary volume by using the management means, and a confirmation process for the pair creation with using the GUI of the management client.

The effect obtained by the representative one of the inventions disclosed in this application will be briefly described as follows.

According to the present invention, a high-speed and advanced function possessed by a highly-functional and high-performance storage system can be achieved in an inexpensive storage system, and consequently, the existing data processing system can be utilized effectively and the cost of the entire system can be reduced.

BRIEF DESCRIPTION OF THE DRAWINGS

FIG. 5 is a flowchart showing the LU setting process provided by the ESM function in the data processing system according to the embodiment of the present invention;

FIG. 6 is an explanatory diagram showing an information management table necessary for mapping in the data processing system according to the embodiment of the present invention;

FIG. 10 is an explanatory diagram showing a PVOL selection screen in the data processing system according to the embodiment of the present invention;

FIG. 12 is an explanatory diagram showing an SVOL selection screen in the data processing system according to the embodiment of the present invention;

FIG. 16 is an explanatory diagram showing a pair creation completion screen in the data processing system according to the embodiment of the present invention;

DESCRIPTION OF THE PREFERRED EMBODIMENTS

Figure 1:
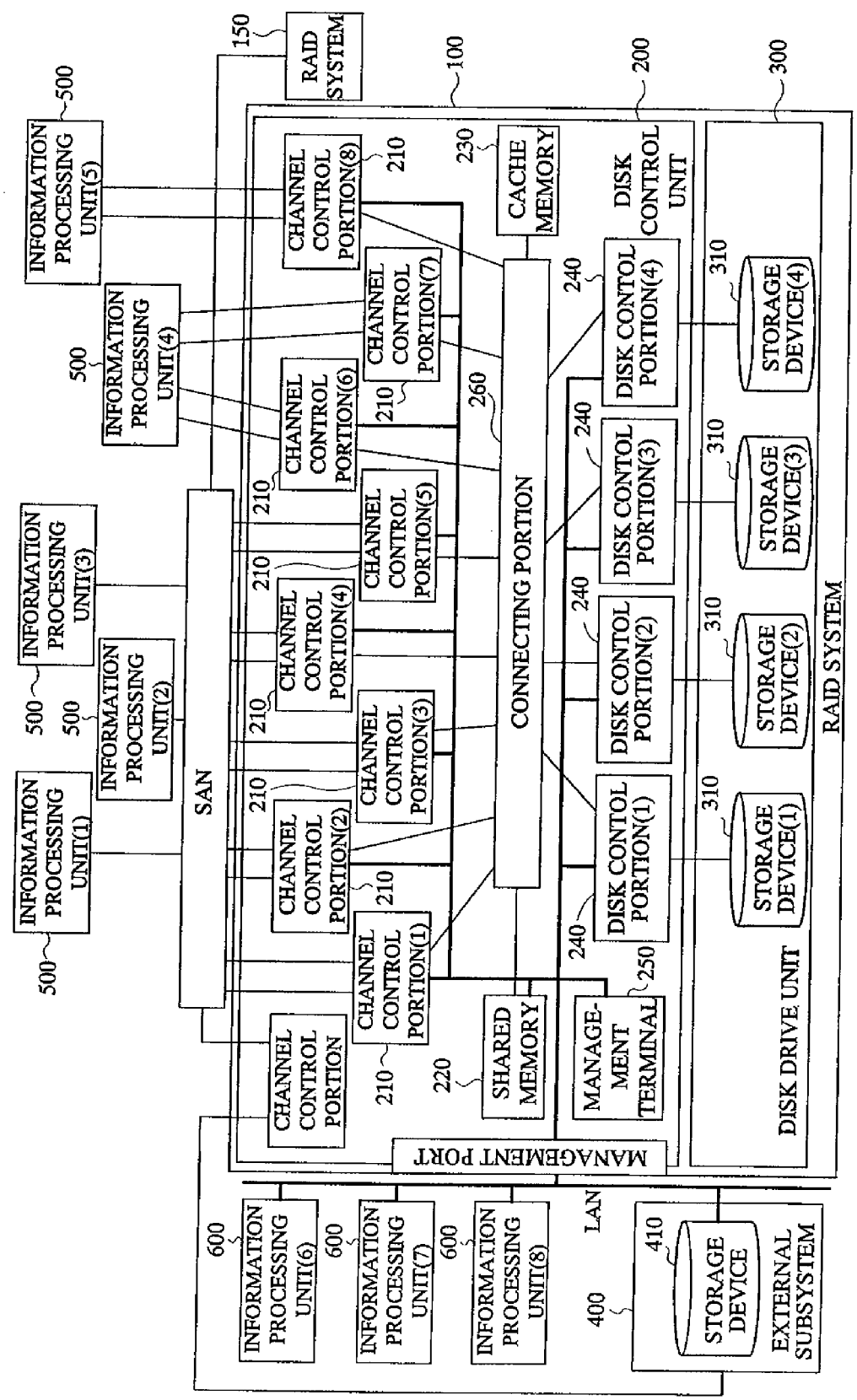
FIG. 1 is a block diagram showing the entire structure of data processing system according to an embodiment of the present invention.

Hereinafter, embodiments of the present invention will be described in detail with reference to the accompanying drawings. Note that components having the same function are denoted by the same reference numerals throughout the drawings for describing the embodiments, and the repetitive description thereof will be omitted.

<Entire Structure of Data Processing System>

An example of the entire structure of the data processing system according to the embodiment of the present invention will be described with reference to FIG. 1. FIG. 1 is a block diagram showing the entire structure of the data processing system.

As shown in FIG. 1, the data processing system of this embodiment comprises RAID systems 100 and 150, an external subsystem 400, an information processing unit 500 of a host system, and an information processing unit 600 of a management client. Hereinafter, the structure and function of the RAID system 100 will be mainly described, and the RAID system 150 also has the same structure and function.

The RAID system 100 is constituted as, for example, a disk array subsystem. The present invention is not limited to this example, and the RAID system 100 can be composed as a highly-functional intelligent-type fiber channel switch.

The RAID system 100 has a disk control unit 200 and a disk drive unit 300. The disk control unit 200 controls the disk drive unit 300 in accordance with a command received from the information processing unit 500 of a host system. For example, the disk control unit 200 receives a data I/O request from the information processing unit 500 of the host system and reads/writes data stored in the storage device 310 provided in the disk drive unit 300. Further, the disk control unit 200 receives various kinds of commands for controlling the RAID system 100 from the information processing unit 600 of a management client so as to carry out various settings of the RAID system 100.

The external subsystem 400 has a storage device 410. Additionally, it can include a channel control portion or a disk control portion. The external subsystem 400 is connected to the RAID system 100 through LAN (local area network) and SAN (storage area network), and the storage device 410 of the external subsystem 400 is handled as an internal storage device of the RAID system 100.

The information processing units 500 and 600 of a host system and a management client are information devices such as a computer having CPU and memory. Various kinds of programs are executed by the CPU possessed by the information processing units 500 and 600 so as to achieve various functions. The information processing units 500 and 600 can be a personal computer or work station or a mainframe computer. Particularly, the information processing unit 500 of a host system is used as a central computer of bank's automatic teller machine or aircraft seat reservation system. Further, the information processing unit 600 of the management client is used as a control computer for maintenance and control of the RAID system 100.

Referring to FIG. 1, the information processing unit 500 of a host system is communicably connected to a disk control unit 200 through SAN. The SAN is a network for exchanging data with the information processing unit 500 of the host system in units of block which is the data management unit in the storage sources provided by the disk drive unit 300. Communication between the information processing unit 500 of the host system and the disk control unit 200 via the SAN is carried out according to a fiber channel protocol. Data access request in units of block is transmitted from the information processing unit 500 of the host system to the RAID system 100 according to the fiber channel protocol.

Further, the information processing unit 500 of the host system can be directly and communicably connected to the disk control unit 200 not through any network such as the SAN. Communication between the information processing unit 500 of the host system and the disk control unit 200 not through the network is made according to communication protocol such as fiber connection (FICON) (Registered Trademark), enterprise system connection (ESCON) (Registered Trademark), advanced connection architecture (ACONARC) (Registered Trademark), fiber connection architecture (FIBARC) (Registered Trademark) and the like. The data access request in units of block is transmitted from the information processing unit 500 of the host system to the RAID system 100 according to these communication protocols.

Of course, the information processing unit 500 of the host system and the disk control unit 200 may be connected not only by the SAN or directly without using the SAN but also through a local area network (LAN). If they are connected through the LAN, the communication therebetween can be made according to, for example, transmission control protocol/internet protocol (TCP/IP).

Also, the information processing unit 600 of the management client is connected to the disk control unit 200 through the LAN. The LAN can be of the Internet or of a dedicated network. The communication between the information processing unit 600 of a management client and the disk control unit 200 executed through the LAN is carried out according to, for example, the TCP/IP protocol. The data access request (data I/O request in units of file) by specifying a file name is transmitted to the RAID system 100 from the information processing unit 600 of the management client.

<Disk Drive Unit>

The disk drive unit 300 has a plurality of storage devices 310. Consequently, it is possible to provide a large-capacity storage area to the information processing unit 500 of the host system and the information processing unit 600 of the management client. The storage device 310 can be formed of data storage medium such as hard disk or a plurality of hard disk drives which constitute redundant arrays of inexpensive disks (RAID). Further, it is possible to set a logical volume which acts as a logical storage area to the physical volume which is a physical storage area provided by the storage device 310.

The disk control unit 200 and the disk drive unit 300 can be directly connected as shown in FIG. 1 or can be connected through a network. Further, the disk drive unit 300 may be constituted integrally with the disk control unit 200.

<Disk Control Unit>

The disk control unit 200 comprises a channel control portion 210, a shared memory 220, a cache memory 230, a disk control portion 240, a control terminal 250 and a connecting portion 260. The disk control unit 200 communicates with the information processing unit 500 of a host system through the SAN using the channel control portion 210 or directly without using the network.

The channel control portion 210 is provided with a communication interface for communicating with the information processing unit 500 of a host system and the information processing unit 600 of a management client and includes a function for exchanging data I/O commands with the information processing units 500 and 600 of the host system and the management client.

Each channel control portion 210 is connected to a control terminal 250 through an internal LAN. Consequently, a micro program to be executed by the channel control portion 210 is sent from the control terminal 250 and can be installed therein.

The connecting portion 260 connects the channel control portion 210, the shared memory 220, the cache memory 230, the disk control portion 240 and the control terminal 250 among one another. Exchange of data and command among the channel control portion 210, the shared memory 220, the cache memory 230, the disk control portion 240 and the control terminal 250 is carried out through the connecting portion 260. The connecting portion 260 is constituted of, for example, a crossbar switch.

The shared memory 220 and the cache memory 230 are memories shared by the channel control portion 210 and the disk control portion 240. While the shared memory 220 is mainly used for storing control information or command, the cache memory 230 is mainly used for storing data.

For example, when a data I/O request which a channel control portion 210 receives from the information processing unit 500 of the host system is a write command, the channel control portion 210 writes the write command into the shared memory 220 and writes the write data received from the information processing unit of the host system into the cache memory 230. On the other hand, the disk control portion 240 monitors the shared memory 220 and when it detects that a write command is written into the shared memory 220, it reads out the write data from the cache memory 230 in accordance with the command and writes it into the storage device 310 in the disk drive unit 300.

Also, if the data I/O request which a channel control portion 210 receives from the information processing unit 500 of the host system is a read command, it is checked whether or not data to be read exists within the cache memory 230. Here, if such data exists within the cache memory 230, the channel control portion 210 sends the data to the information processing unit 500 of the host system. On the other hand, if no data to be read exists within the cache memory 230, the channel control portion 210 writes a read command into the shared memory 220 and monitors the shared memory 220. After detecting that the read command is written into the shared memory 220, the disk control portion 240 reads the data to be read from the storage device 310 in the disk drive unit 300 and writes it into the cache memory 230, and at the same time, writes a related note into the shared memory 220. Then, when the channel control portion 210 detects that the data to be read is written into the cache memory 230, the data is set to the information processing unit 500 of the host system.

In this way, data is exchanged between the channel control portion 210 and the disk control portion 240 through the cache memory 230, and of the data to be stored in the storage device 310, data read or written by the channel control portion 210 or the disk control portion 240 is stored in the cache memory 230.

In addition to a structure in which data write or read from the channel control portion 210 to the disk control portion 240 is instructed indirectly through the shared memory 220, for example, the structure in which the data write or read is instructed from the channel control portion 210 to the disk control portion 240 directly not through the shared memory 220 is also available. Further, a data I/O control portion may be provided by providing the channel control portion 210 with the function of the disk control portion 240.

The disk control portion 240 is communicably connected to the plural storage devices 310 which storing data so as to control the disk drive unit 300. For example, as described above, data read/write to the storage device 310 is executed in accordance with the data I/O request which the channel control portion 210 receives from the information processing unit 500 of the host system.

The respective disk control portions are communicably connected through the internal LAN together with the control terminal 250. Consequently, a micro program to be executed by the disk control portion 240 can be transmitted from the control terminal 250 and installed therein.

Although the shared memory 220 and the cache memory 230 are provided independently of the channel control portion 210 and the disk control portion 240 in this embodiment, the present invention is not limited to this example, and it is also preferable that the shared memory 220 or the cache memory 230 may be provided separately in each of the channel control portion 210 and the disk control portion 240. In this case, the connecting portion 260 mutually connects the channel control portion 210 and the disk control portion 240 having the dispersed shared memories 220 or the cache memories 230.

The structure is also preferable in which at least any one of the channel control portion 210, the disk control portion 240, the connecting portion 260, the shared memory 220 and the cache memory 230 is integrated with the other one.

The control terminal 250 is a computer for maintenance and control of the RAID system 100. By operating the control terminal 250, an operator can carry out setting of the configuration of the storage device 310 in the disk drive unit 300, setting of a path which is a communication path between the information processing unit 500 of the host system and the information processing unit 600 of the management client and the channel control portion 210, setting of logical volume and installation of a micro program to be executed in the channel control portion 210 and the disk control portion 240. The settings of the configuration of the storage devices 310 in the disk drive unit 300 include the increase and decrease of the number of the storage devices 310 or the configuration change of the RAID (changing from the RAID 1 to RAID 5).

Further, the control terminal 250 can perform the confirmation of the operating condition of the RAID system 100, the determination of a fault position, and the installation of an operating system which the channel control portion 210 executes. These settings and controls can be carried out from a user interface included in the control terminal 250 or a user interface of the information processing unit 600 of the management client which displays a web page provided by the web server operating under the control terminal 250. An operator can set an object and contents to be monitored about a trouble and a destination of notification about the trouble by operating the control terminal 250.

The control terminal 250 can be incorporated in the disk control unit 200 or provided externally. Further, the control terminal 250 can be a computer dedicated for maintenance and control of the disk control unit 200 and the disk drive unit 300 or a general-purpose computer provided with maintenance and control function.

<Structure of Principal Part of Data Processing System>

Figure 2:
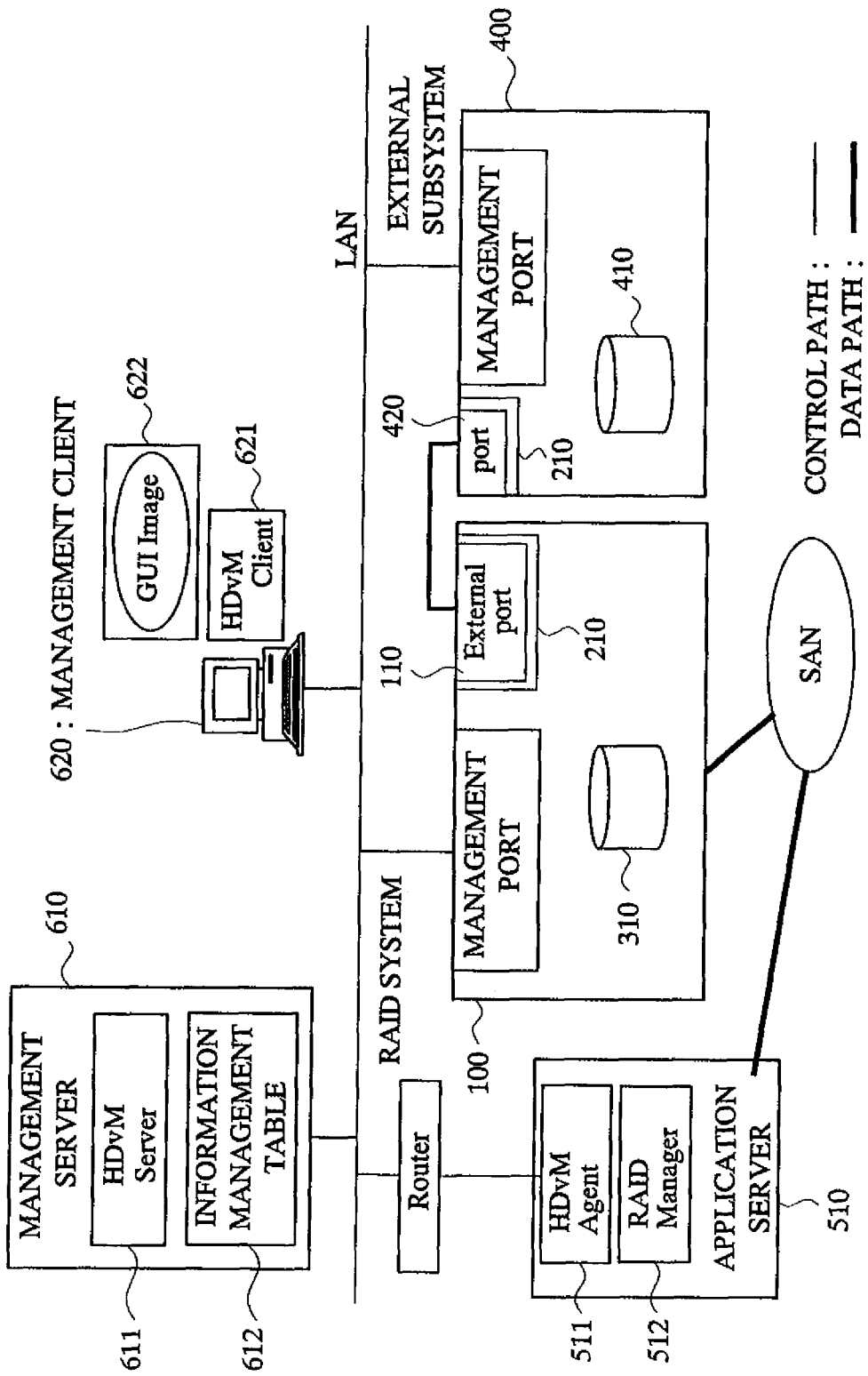
FIG. 2 is a block diagram showing the structure of principal parts of the data processing system according to an embodiment of the present invention.
Figure 21:
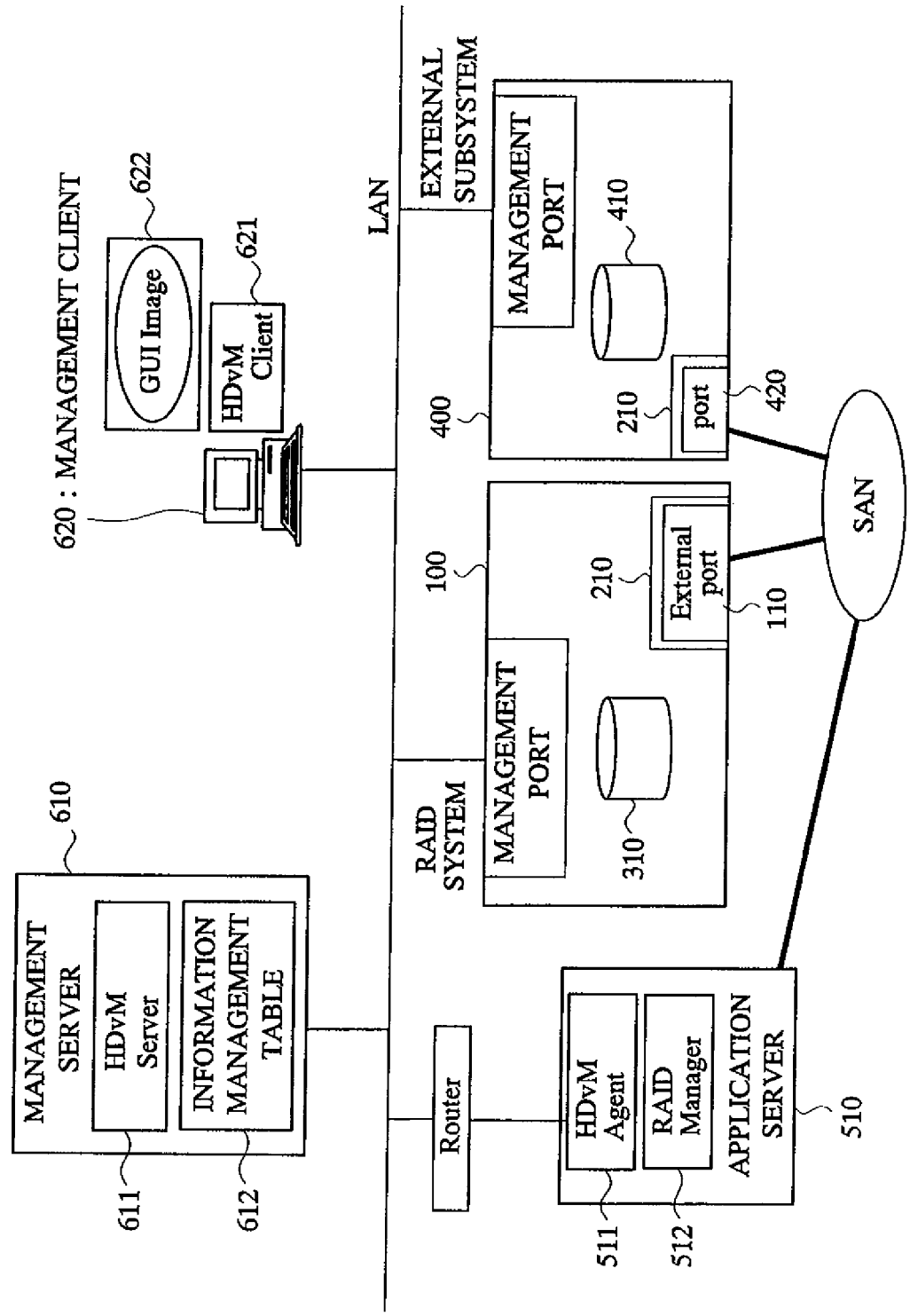
FIG. 21 is a block diagram showing the structure of principal parts in another data processing system relative to FIG. 2 according to the embodiment of the present invention.

An example of the structure of principal parts of the data processing system according to an embodiment of the present invention will be described with reference to FIGS. 2 and 21. FIG. 2 is a block diagram showing the structure of the principal parts of the data processing system, and FIG. 21 is a diagram showing the structure of principal parts of other example of the data processing system.

As for the data processing system of this embodiment, its entire structure and each function of the components are the same as those described in detail with reference to FIG. 1. The structure of the principal part which is a feature of this embodiment includes, as shown in FIG. 2, a RAID system 100 as a first storage system, an external subsystem 400 as a second storage system, an application server 510 as a host system (information processing unit 500 in FIG. 1) for executing data I/O with the RAID system 100, and a management server 610 and management client 620, which are management units (information processing unit 600 in FIG. 1) for controlling the configuration information of the RAID system 100 and the external subsystem 400, and the RAID system 100 and the application server 510 are communicably connected to each other through the SAN. The RAID system 100, the external subsystem 400, the application server 510, the management server 610 and the management client 620 are communicably connected among one another through the SAN.

This data processing system can establish a backup operating system by using a storage control software which is control means for controlling a control device for issuing a command to a storage subsystem, namely a software called command device manager (abbreviated as HDvM here).

The RAID system 100 is a storage subsystem having a function to connect external storages (external storage management: abbreviated as ESM) to be objects for the control by the HDvM. This ESM function is a technology for mapping a volume of an external storage subsystem within its own storage subsystem as a virtual volume. This RAID system 100 includes a storage device 310, and a logical volume and a logical volume (virtual volume) which is an object for mapping are set in this storage device 310. Further, the RAID system 100 includes an external port 110 which is connected to an external subsystem 400 through a data path. This external port is a port provided in the channel control portion 210. Further, the control port is connected to LAN through a control path.

The external subsystem 400 is an object for control by the HDvM and is a storage subsystem to be an object for external storage of the RAID system 100. This external subsystem 400 includes the storage device 410 and a logical volume to be mapped in a logical volume (virtual volume) which is a mapping object of the RAID system 100 is set in this storage device 410. Further, the external subsystem 400 has a port 420 which is connected to the RAID system 100 through data path. Also, the control port is connected to the LAN through a control path.

As shown in FIG. 21, the external port 110 of the RAID system 100 and the port 420 of the external subsystem 400 can be connected by a data path through the SAN, and this structure also achieves the ESM function.

The management server 610 is a computer system for installing the HDvM server 611. This management server 610 may be used as a management client. The management client 620 is a computer system in which the HDvM client 621 operates. This management client 620 may be incorporated in the management server 610.

In the management server 610 and the management client 620, the database of the management server 610 includes an information management table 612 for fetching the configuration information of the RAID system 100 and the configuration information of the external subsystem 400 and storing mapping information about logical volume (virtual volume) which is an object of mapping by the RAID system 100 and logical volume of the external subsystem 400. In the copy process, the HDvM enables the pair creation from the GUI image 622 of the management client 620, in which a logical volume of the RAID system 100 is set as a primary volume of copy source and a virtual volume mapped from a logical volume of the external subsystem 400 is set as a secondary volume of copy destination by using information management table 612.

The application server 510 is a host computer system having the functions of the HDvM agent 511 and the RAID manager 512.

This data processing system is a backup operating system including the RAID system 100 which provides the ESM function the and the HDvM of the storage control software and has an online copy function within the storage subsystem, namely a copy function called shadow image here. When this HDvM controls the configuration information necessary for backup operation by means of all the storage subsystems through the RAID system 100, all the storage subsystems can be controlled integrally by the RAID system 100 and the HDvM.

<Process for Establishing Backup Operating System>

Figure 3:
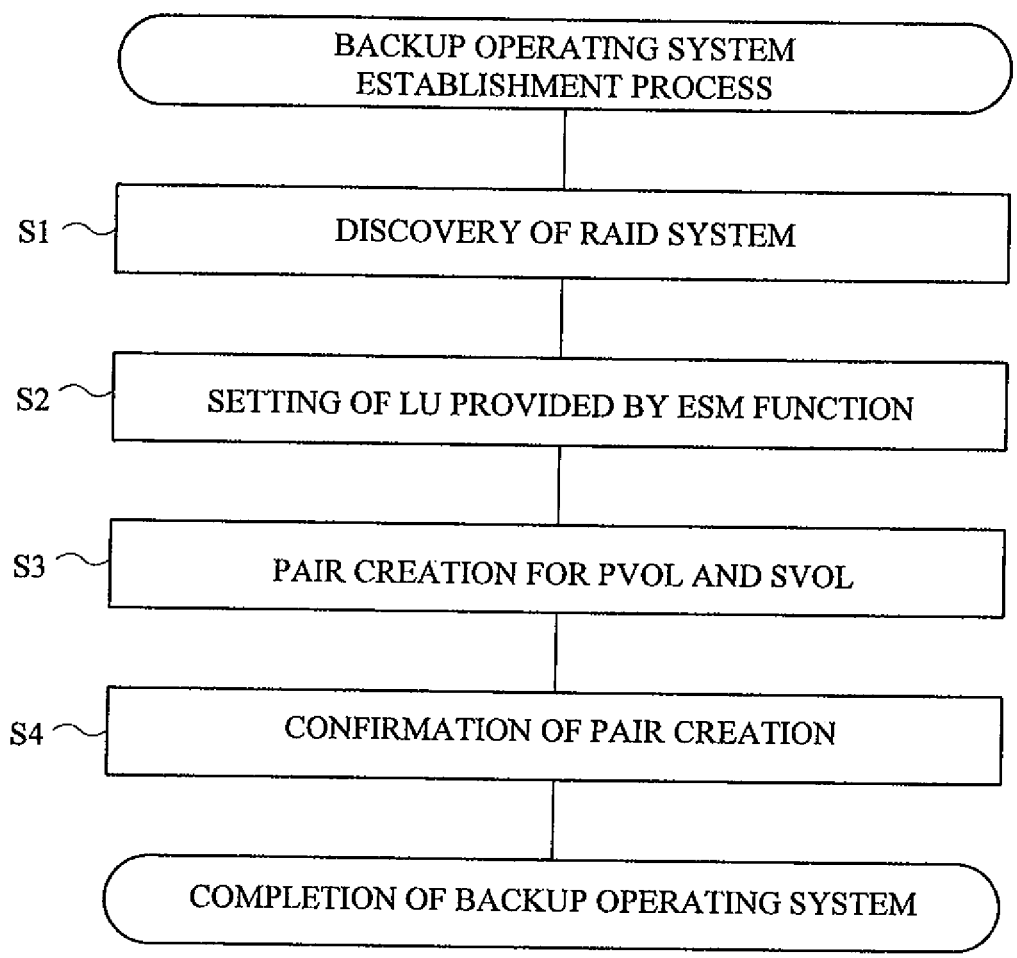
FIG. 3 is a flowchart showing the process for establishing the backup operating system in the data processing system according to the embodiment of the present invention.

An example of the process for establishing the backup operating system in the data processing system according to an embodiment of the present invention will be described with reference to FIG. 3. FIG. 3 is a flowchart showing the process of establishing the backup operating system.

In the following description, the logical volume is sometimes expressed as "volume", "VOL" or "LDEV (logical device)". If speaking in detail, this "LDEV" is a unit of a storage area divided logically. Further, the unit of a storage area which serves as a unit for I/O access is called "LU (logical unit)" and a single LU may be gained by combining plural LDEVs. The number for identifying this LU is "LUN (logical unit number)". Further, of these logical volumes, the one set in the system is called internal volume and the one set outside is called external volume, while the one set virtually is called virtual volume. Additionally, a logical volume to be copied is called "PVOL (primary volume)" and a logical volume of copy destination is called "SVOL (secondary volume)".

In the process of establishing the backup operating system, as shown in FIG. 3, first, discovery process of the RAID system 100 is carried out by the HDvM (S1). Further, the setting process of the LU provided by the ESM function using the HDvM is carried out (S2). Subsequently, pair creation process using the HDvM in which the internal LDEV loaded on the RAID system 100 is set as PVOL and the internal LDEV mapped from the external subsystem 400 is set as SVOL is carried out (S3). Then, confirmation process of the pair creation process by using a GUI image 622 of the management client 621 is carried out (S4). Consequently, the backup operating system is completed so that the mapped external volume can be used as SVOL of a shadow image.

<Discovery Process of RAID System (S1)>

Figure 4:
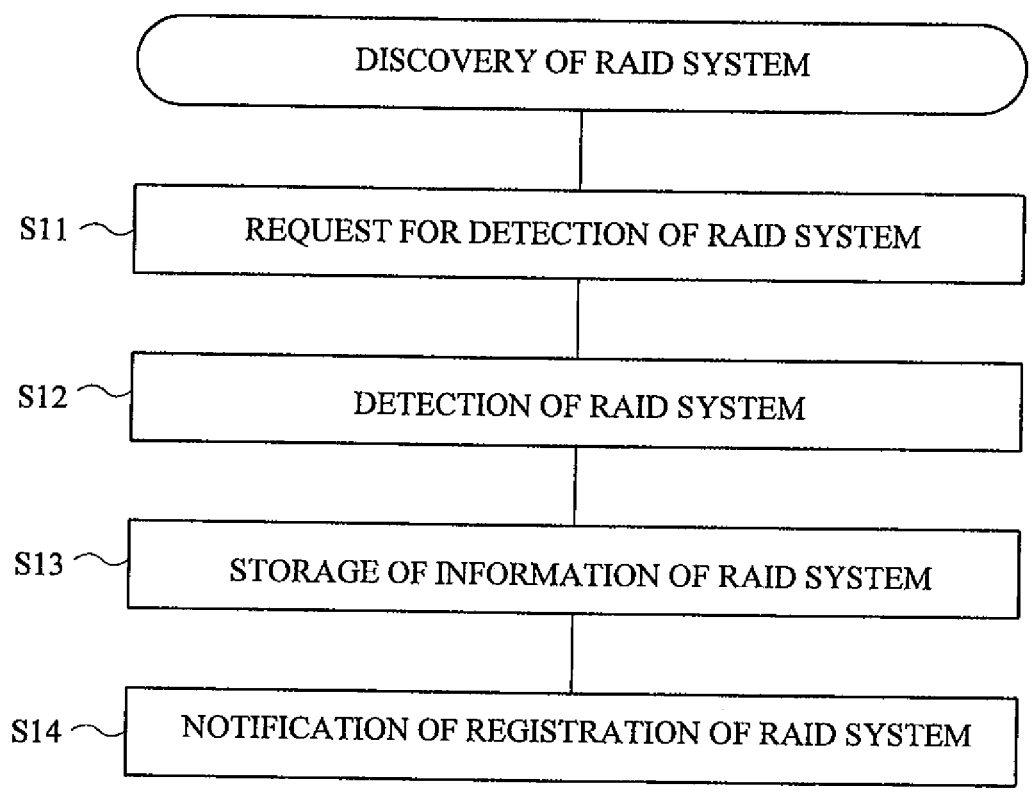
FIG. 4 is a flowchart showing the discovery process of RAID system in the data processing system according to the embodiment of the present invention.

An example of the discovery process (S1) of the RAID system will be described with reference to FIG. 4. FIG. 4 is a flowchart showing the discovery process (S1) of the RAID system.

In the discovery process (S1) of the RAID system by the HDvM, as shown in FIG. 4, first, the HDvM client 621 requests the HDvM server 612 to detect the RAID system 100 (S11). Then, the HDvM server 612 detects the RAID system 100 by a RAID manager 512, stores its information in the database within the management server 610 and notifies the HDvM client 621 of the registration of the RAID system 100

(S12-S14). Consequently, the detection of the RAID system 100 by the HDvM is completed.

<Setting Process of LU Provided by ESM Function (S2)>

Figure 7:
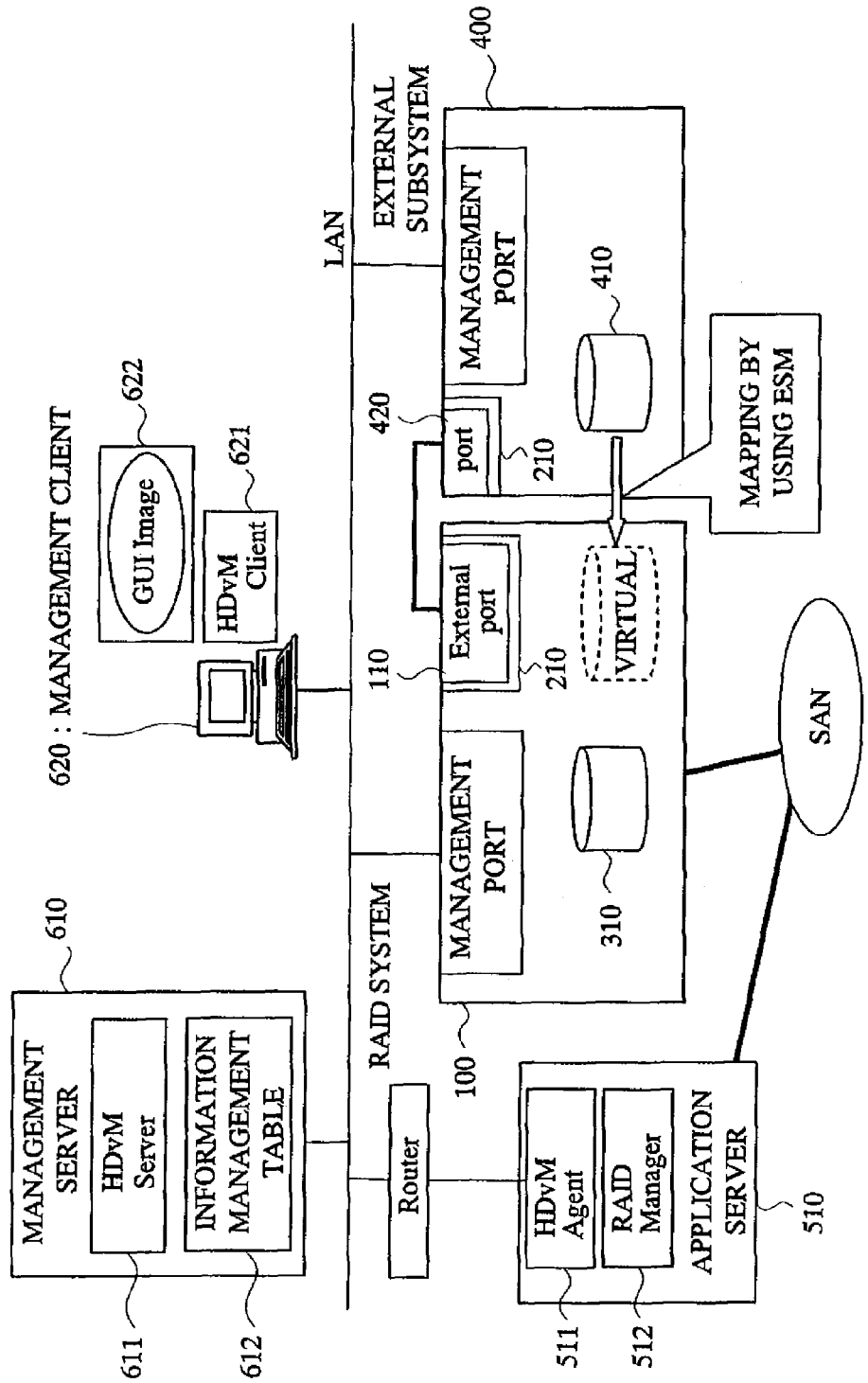
FIG. 7 is an explanatory diagram showing a configuration for mapping by the ESM function in the data processing system according to the embodiment of the present invention.

An example of the setting process of the LU provided by the ESM function will be described with reference to FIGS. 5 to 7. FIG. 5 is a flowchart showing the setting process (S2) of the LU provided by the ESM function, FIG. 6 is an explanatory diagram showing an information management table necessary for mapping, and FIG. 7 is an explanatory diagram showing the configuration for mapping by the ESM function.

In the setting process (S2) of the LU provided by the ESM function using the HDvM, as shown in FIG. 5, the RAID system 100 sets a port of the RAID system 100 in the external port 110 with using a storage navigator which is a subsystem control view of the RAID system 100 of the HDvM so that the RAID system 100 can use the ESM function (S21). Then, the external subsystem 400 is set with using the HDvM in order for the RAID system 100 to discover the external LU (S22).

In the setting of the external subsystem 400, the port attribute of the external subsystem 400 to be connected to the external port 110 is changed (S22a). Then, this changed port is selected and "addition of storage" is executed (S22b). That is, a host system identified as the external port 110 is selected and the LUN security relating to accessibility from this host system is added.

Subsequently, the discovery of the external LU is executed with using the storage navigator so as to make the RAID system 100 recognize the external LU (S23). Then, the external LU is mapped on the internal LDEV with using the storage navigator in order to make the discovered external LU available in the RAID system 100 (S24).

In the mapping of this external LU to the internal LDEV, first, an external volume group is determined (S24a). That is, the external volume is registered in the management server 610 as an external volume group in order to map the external volume as the internal volume. Further, an IO suppression mode is determined (S24b). More specifically, input/output from a host system to a mapped volume is enabled when the external volume is mapped as an internal volume. Consequently, the mapped volume can be used from the host system as if it is a volume of the RAID system 100. Then, an emulation type is set (S24c).

As shown in FIG. 6, the configuration information fetched from the RAID system 100 and the configuration information fetched from the external subsystem 400 are stored in the information management table 612 necessary for this mapping. The internal LUN information from the RAID system 100 includes virtual LUN information. The external LUN information of the external subsystem allocated to the virtual LUN of this RAID system 100 includes serial number of the external subsystem 400 (serial number), identification information of storage device (device ID), LUN number (external LUN) for identifying the LUN which is path information to the storage device, identification information (external WWN) unique to each port, and information of machine name (vender).

The LU to be set in the storage device 410 of the external subsystem 400 is mapped in this information management table 612 through the external port 110 as a virtual VOL set in the storage device 310 of the RAID system 100. Consequently, a user can operate the internal LDEV mapped in the information management table 612 in the same way as that for the internal LDEV loaded on the RAID system 100 with using the HDvM as shown in FIG. 7.

<Pair Creation Process for PVOL and SVOL (S3)>

Figure 8:
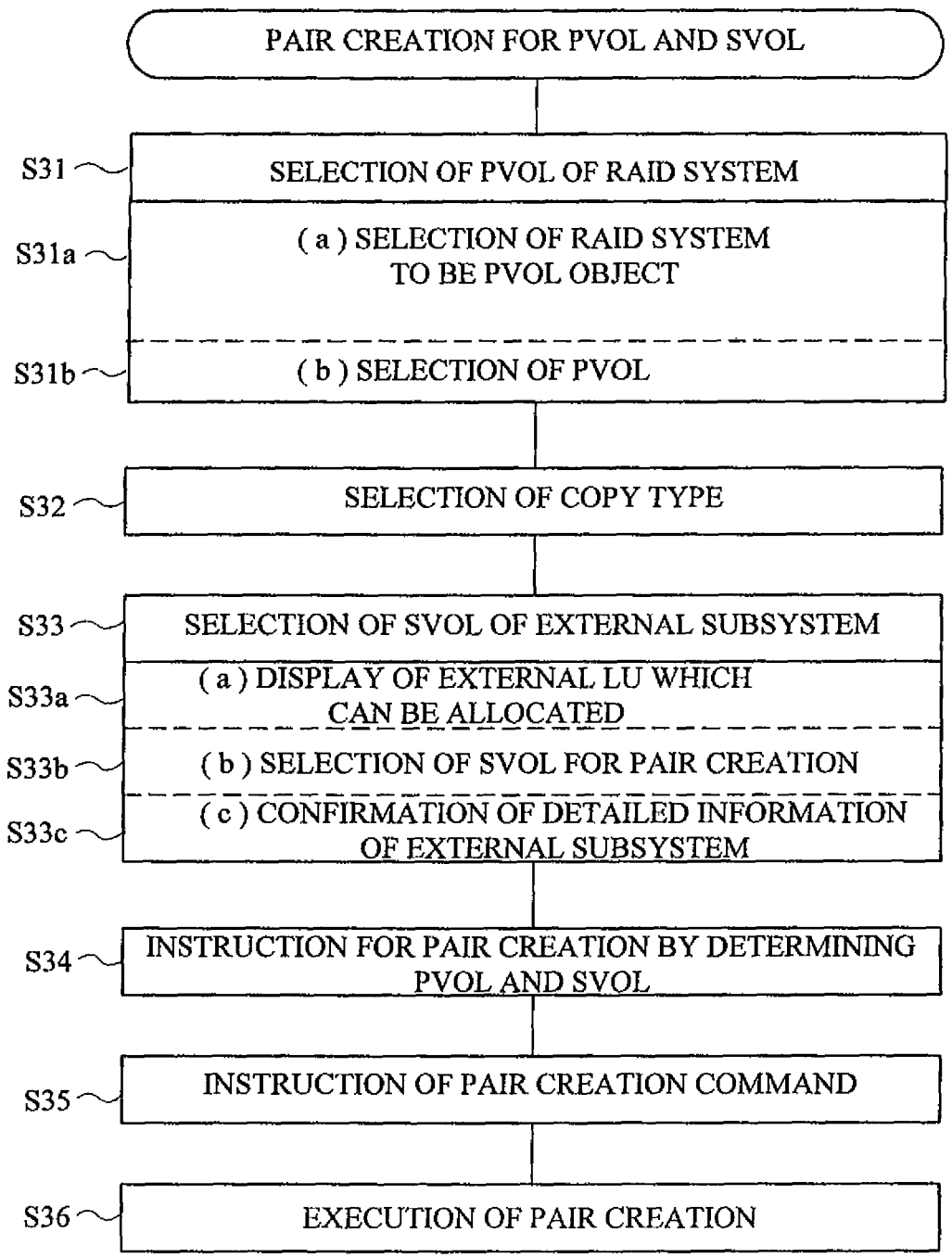
FIG. 8 is a flowchart showing a pair creation process for PVOL (primary volume) and SVOL (secondary volume) in the data processing system according to an embodiment of the present invention.
Figure 9:
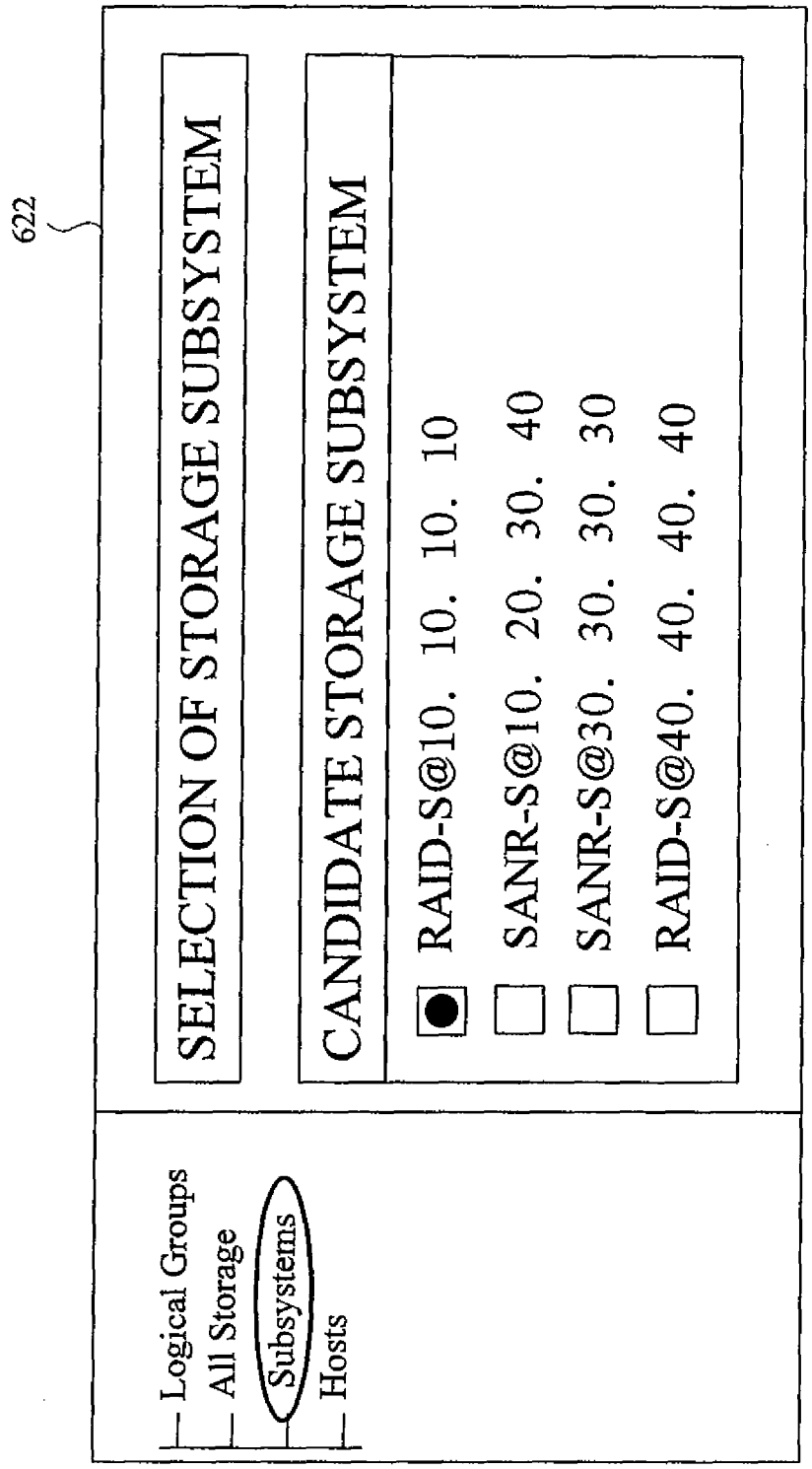
FIG. 9 is an explanatory diagram showing a selection screen of a storage subsystem for PVOL in the data processing system according to an embodiment of the present invention.
Figure 11:
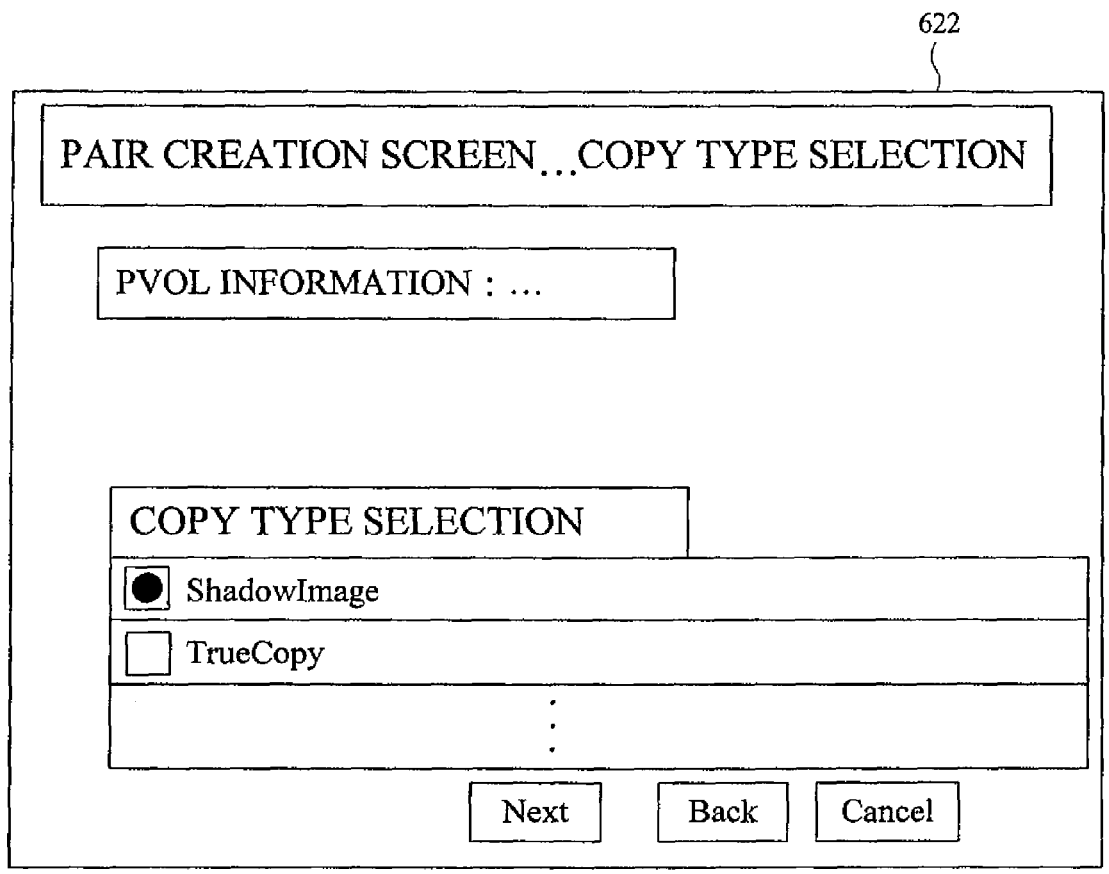
FIG. 11 is an explanatory diagram showing a copy type selection screen in the data processing system according to the embodiment of the present invention.
Figure 13:
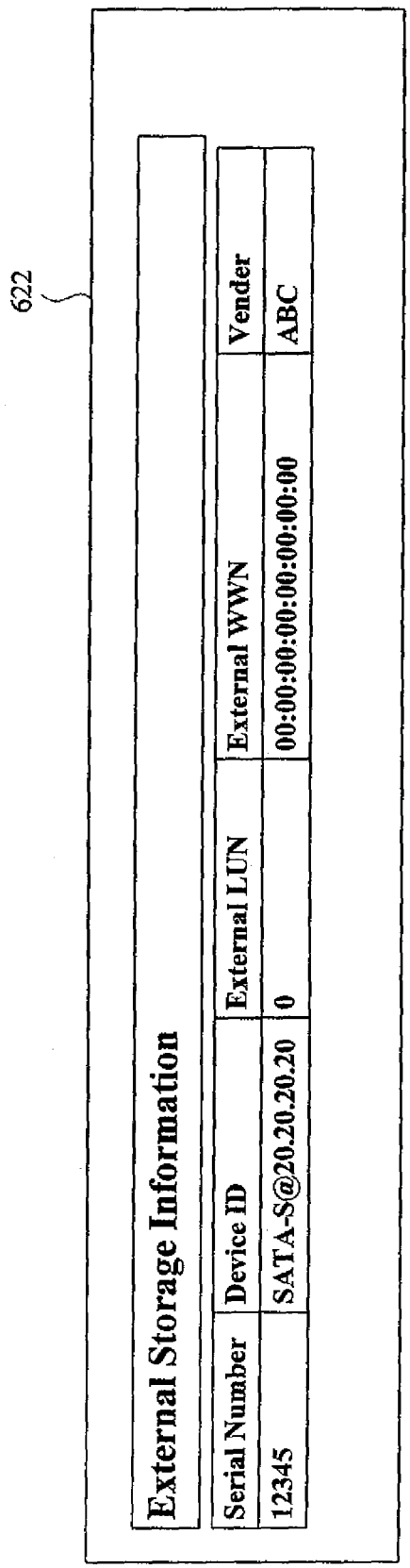
FIG. 13 is an explanatory diagram showing an SVOL detail screen in the data processing system according to the embodiment of the present invention.
Figure 14:
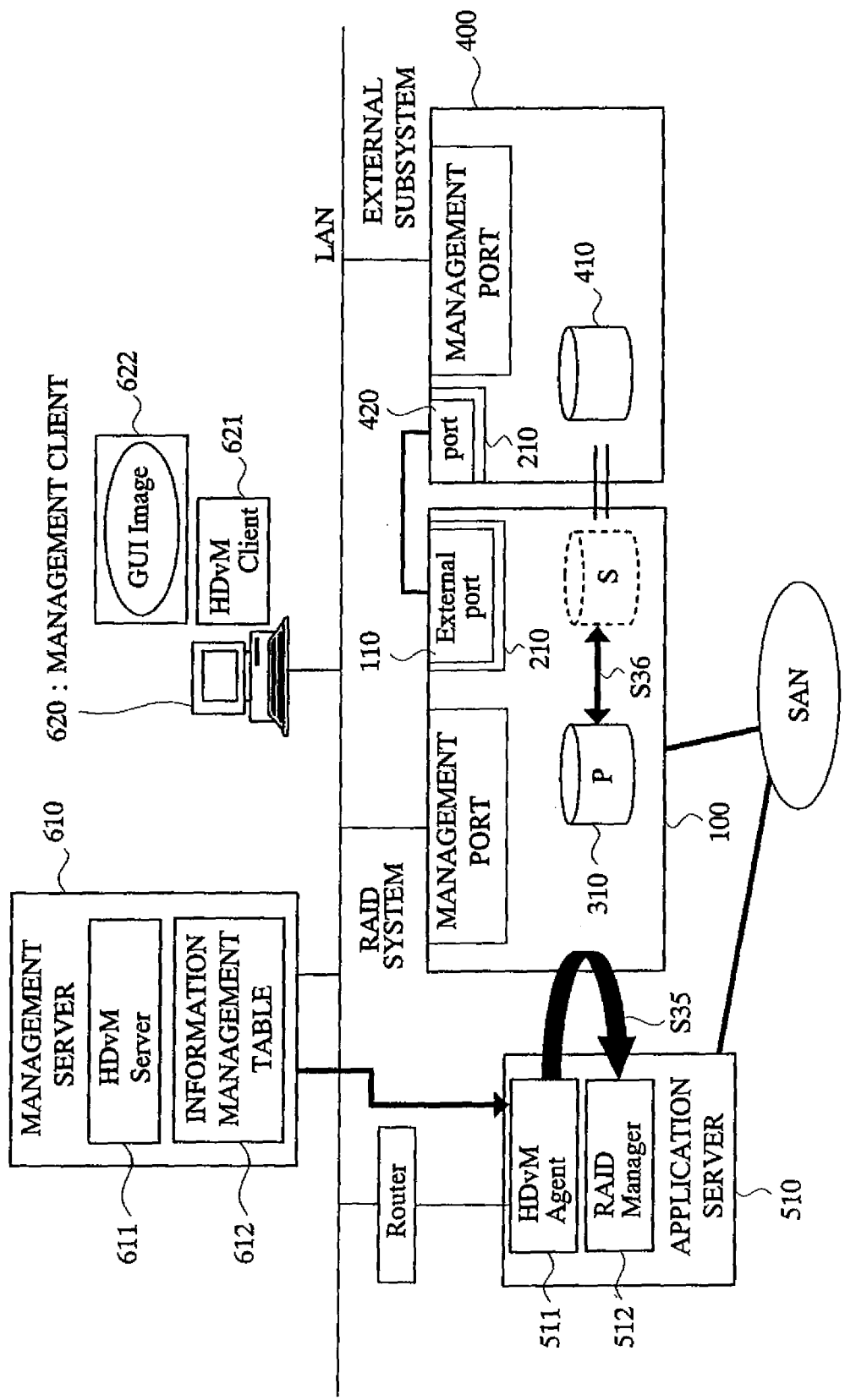
FIG. 14 is an explanatory diagram showing a pair creation process after the PVOL and SVOL are determined in the data processing system according to the embodiment of the present invention.

An example of the pair creation process for PVOL and SVOL will be described with reference to FIGS. 8 to 14. FIG. 8 is a flowchart showing the pair creation process (S3) for PVOL and SVOL. FIG. 9 is an explanatory diagram showing a selection screen of the storage subsystem for PVOL. FIG. 10 is an explanatory diagram showing PVOL selection screen. FIG. 11 is an explanatory diagram showing a copy type selection screen. FIG. 12 is an explanatory diagram showing SVOL selection screen. FIG. 13 is an explanatory diagram showing the detailed screen of SVOL. FIG. 14 is an explanatory diagram showing pair creation process after PVOL and SVOL are determined.

In the pair creation process (S3) by using this HDvM, in which the internal LDEV loaded on the RAID system 100 is set as PVOL and the internal LDEV mapped from the external subsystem 400 is set as SVOL (S3), first, a storage subsystem to be set as PVOL is selected with using the GUI image 622 of the HDvM (S31).

In this selection, first, the RAID system 100 to be an object of the PVOL is selected (S31a). For example, in the GUI image 622 shown in FIG. 9, RAID-S@10.10.10.10 is selected from candidate storage subsystems. Then, PVOL is selected in an identification screen of the internal/external volumes (S31b). For example, in the GUI image 622 shown in FIG. 10, LDEV "0:35" is selected from an object list.

Further, a copy type of a selected PVOL is selected (S32). For example, in the GUI image 622 shown in FIG. 11, "shadow image" is selected from a selection of the copy types. After that, the external subsystem to be used as SVOL is selected (S33).

In this selection, external LUs which are not allocated yet and can be allocated depending on the size and emulation type are displayed (S33a). At this time, less expensive VOL (volumes) are sensed and displayed by priority. Further, SVOL (secondary volume) for pair creation is selected (S33b). For example, in the GUI image 622 shown in FIG. 12, LDEV "0:45" is selected from LDEV list. The "0:45" of this LDEV indicates the location of the storage subsystem (SATA-S@20.20.20.20). Then, the detailed information of the external subsystem 400 is confirmed (S33c). For example, in the GUI image 622 shown in FIG. 13, various identification numbers and identification information are displayed. This means that PVOL and SVOL are determined.

Subsequently, after PVOL and SVOL are determined, as shown in FIG. 14, the management server 610 instructs the application server 510 to create a pair (S34). Further, the HDvM agent 511 of the application server 510 issues a pair creation command to the RAID manager 512 (S35). Then, the RAID manager 512 throws a command line interface (CLI) command for pair creation to the RAID system 100 so as to execute the pair creation (S36).

<Confirmation Process of Pair Creation (S4)>

Figure 15:
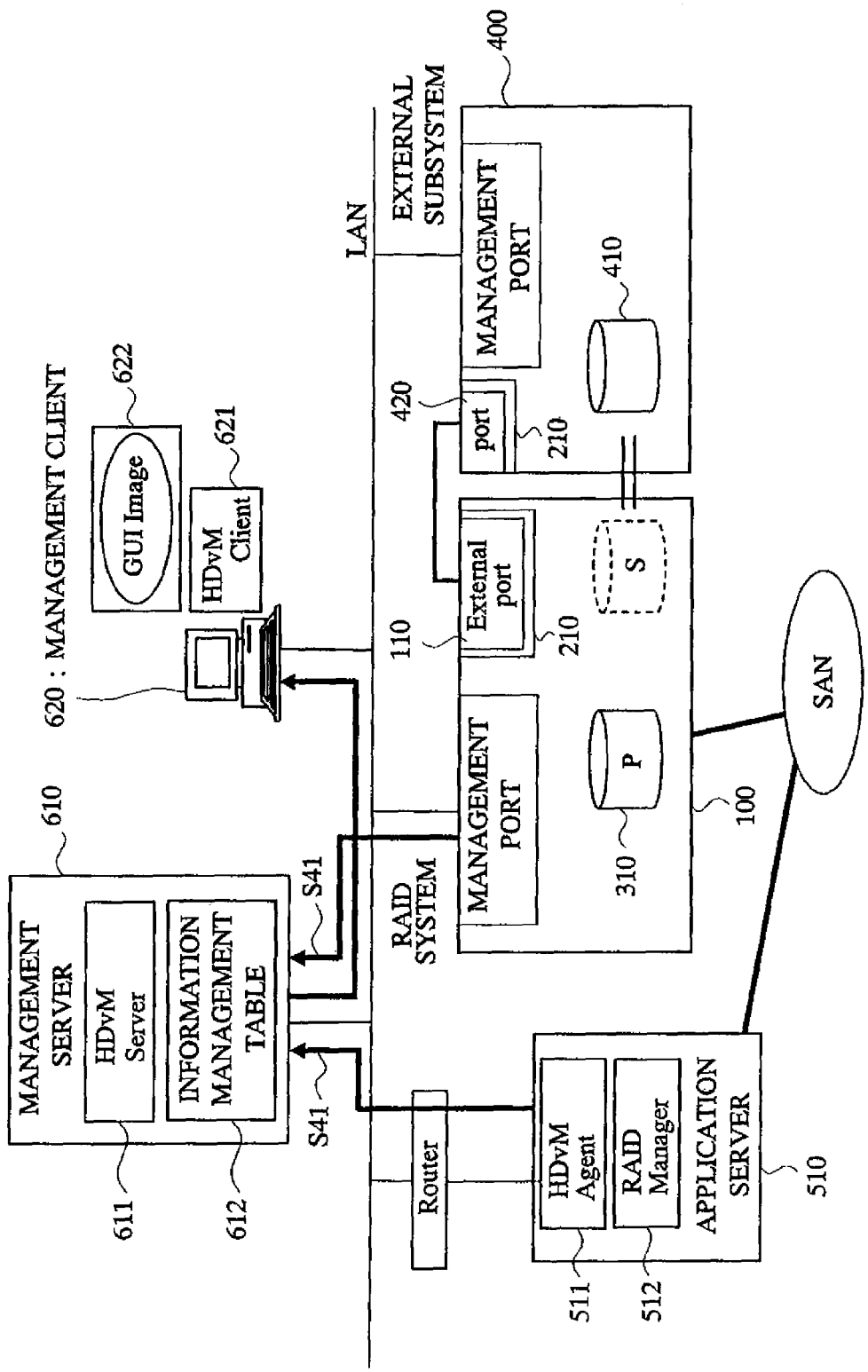
FIG. 15 is an explanatory diagram showing a confirmation process for the pair creation in the data processing system according to the embodiment of the present invention.

An example of the confirmation process (S4) of the pair creation will be described with reference to FIGS. 15 and 16. FIG. 15 is an explanatory diagram showing the confirmation process (S4) for the pair creation, and FIG. 16 is an explanatory diagram showing a pair creation completion screen.

In the confirmation process (S4) of the pair creation using the GUI image 622 of this management client 620, as shown in FIG. 15, the management server 610 acquires information from the RAID system 100 or acquires information obtained by the RAID manager 512 through the HDvM agent 511 of the application server 510 so as to recognize it as copy pair information (S41). Thereafter, by delivering the information of the management server 610 to the management client 620, the pair creation can be confirmed through the GUI image 622 of the management client 620 (S42). For example, the completion of the pair creation in which the LDEV "35" of RAID-S@10.10.10.10 which is the RAID system 100 is set as PVOL and the LDEV "45" of SATA-S@20.20.20.20 mapped from the external subsystem 400 is set as SVOL can be confirmed through the GUI image 622 as shown in FIG. 16.

Figure 17:
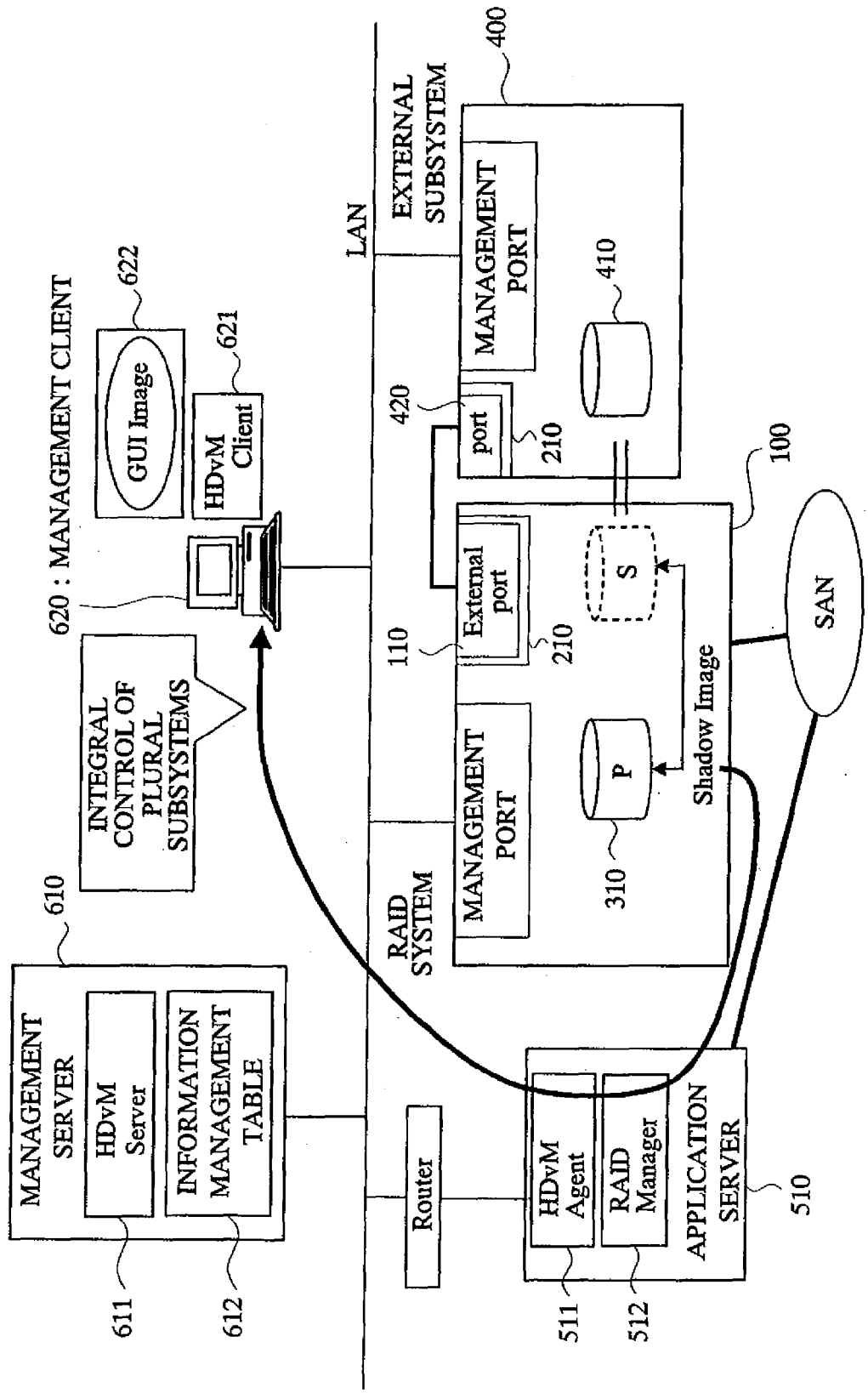
FIG. 17 is an explanatory diagram showing a backup operating system in the data processing system according to the embodiment of the present invention.

The backup operating system as shown in FIG. 17 is completed through the discovery process (S1) of the RAID system, the setting process (S2) of the LU provided by the ESM function, the pair creation process (S3) for PVOL and SVOL and the confirmation process (S4) of the pair creation. Consequently, a data processing system using the mapped external volume as a shadow image SVOL can be established. That is, a high-speed and advanced function possessed by the RAID system 100 can be applied to the LU of an inexpensive external subsystem 400.

<Write Operation of Data into External Subsystem>

Figure 18A:
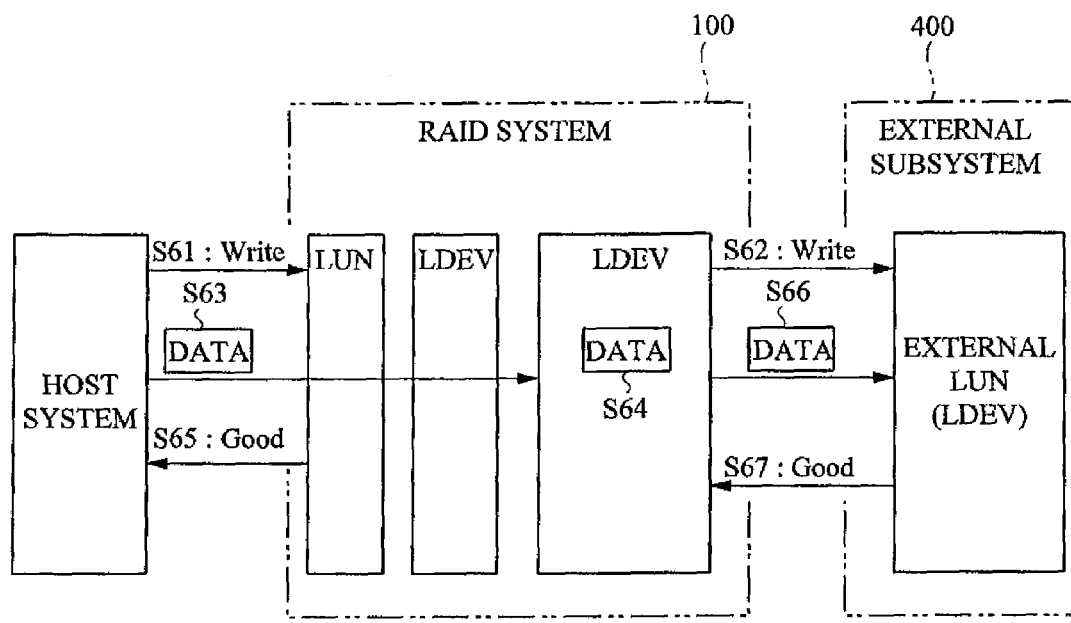
FIG. 18 is an explanatory diagram showing a data write operation into an external subsystem in the data processing system according to the embodiment of the present invention.
Figure 18B:
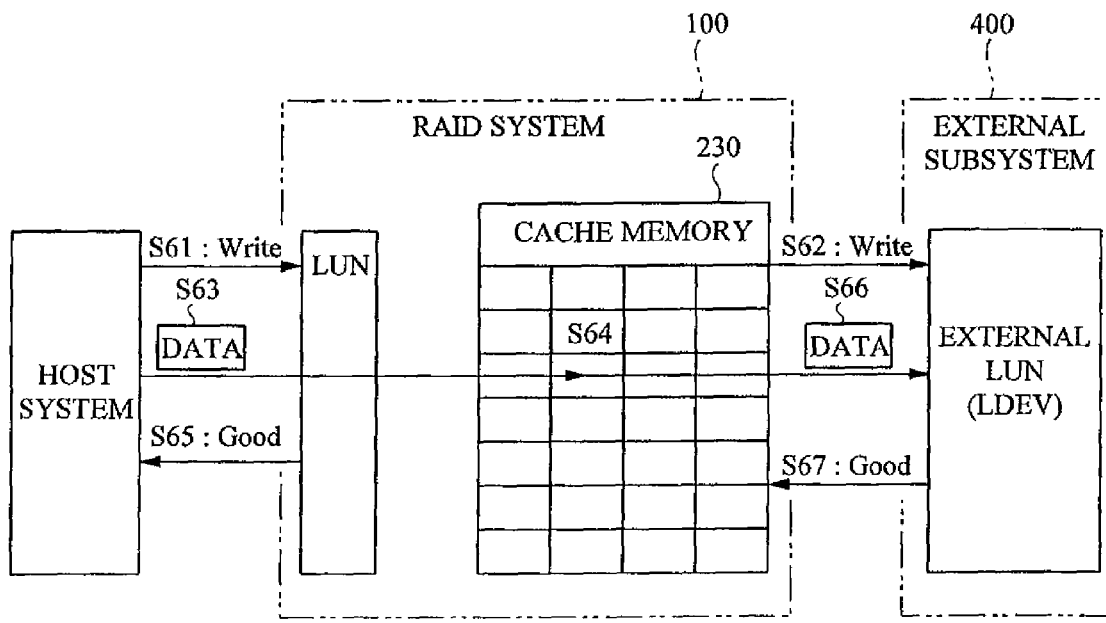

An example of the write operation of data into the external subsystem will be described with reference to FIG. 18. FIG. 18 is an explanatory diagram showing the write operation of data into the external subsystem.

The host system such as the application server 510 can write data into the logical volume (LDEV) provided by the RAID system 100. For example, it is possible to set the host system to access only a particular LDEV according to the zoning in which a virtual SAN subnet is set in the SAN or the LUN masking in which the host system holds a list of accessible LUNs.

If the LDEV to which the host system intends to write data is connected to the storage device 310 of the internal RAID system 100 through a virtual volume (VDEV: virtual device), the data is written through ordinary process. That is, the data from the host system is temporarily stored in the cache memory 230 and it is stored into a predetermined address of a predetermined storage device 310 from this cache memory 230 through the disk control portion 240. At this time, the disk control portion 240 converts the logical address to the physical address. Further, in the case of the RAID configuration, the same data is stored in plural storage devices 310.

Contrary to this, if LDEV to which the host system intends to write is connected to the storage device 410 of the external subsystem 400 through the virtual device, data is written in the manner shown in FIG. 18. FIG. 18(*a*) is a flowchart mainly showing memory hierarchy and FIG. 18(*b*) is a flowchart mainly showing the way of usage of the cache memory 230.

First, the host system clarifies an LDEV number for specifying the LDEV of write destination and a WWN for specifying a port for accessing this LDEV and issues a write command (write) (S61). When the RAID system 100 receives a write command from the host system, it generates a write command to be sent to the external subsystem 400 and sends it to the external subsystem 400 (S62). The RAID system 100 changes write destination address information in the write command received from the host system in accordance with the external LDEV and generates a new write command.

Subsequently, the host system sends data to be written to the RAID system 100 (S63). Data received by the RAID system 100 is transmitted from the LDEV through the VDEV (S64) to the LDEV of the external subsystem 400 (S66). When the RAID system 100 stores data from the host system in the cache memory 230, it sends back a response (good) indicating that the write is completed to the host system (S65). When the external subsystem 400 receives data from the RAID system 100 (or when write into the storage device 410 is completed), it sends a write completion notification to the RAID system 100 (S67). That is, the timing when the RAID system 100 notifies the host system of the write completion (S65) is different from the timing when data is actually stored in the storage device 410 (non-synchronous method). Therefore, the host system is released from the data write process before the data is actually stored in the storage device 410 and thus can execute other process.

<Operation for Reading Data from External Subsystem>

Figure 19A:
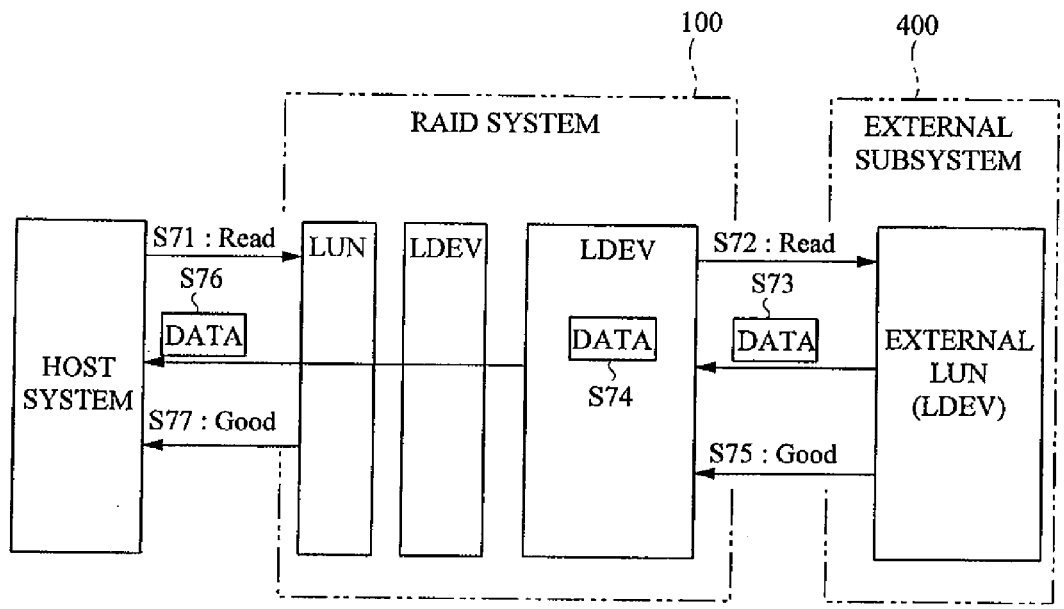
FIG. 19 is an explanatory diagram showing a data read operation from an external subsystem in the data processing system according to the embodiment of the present invention.
Figure 19B:
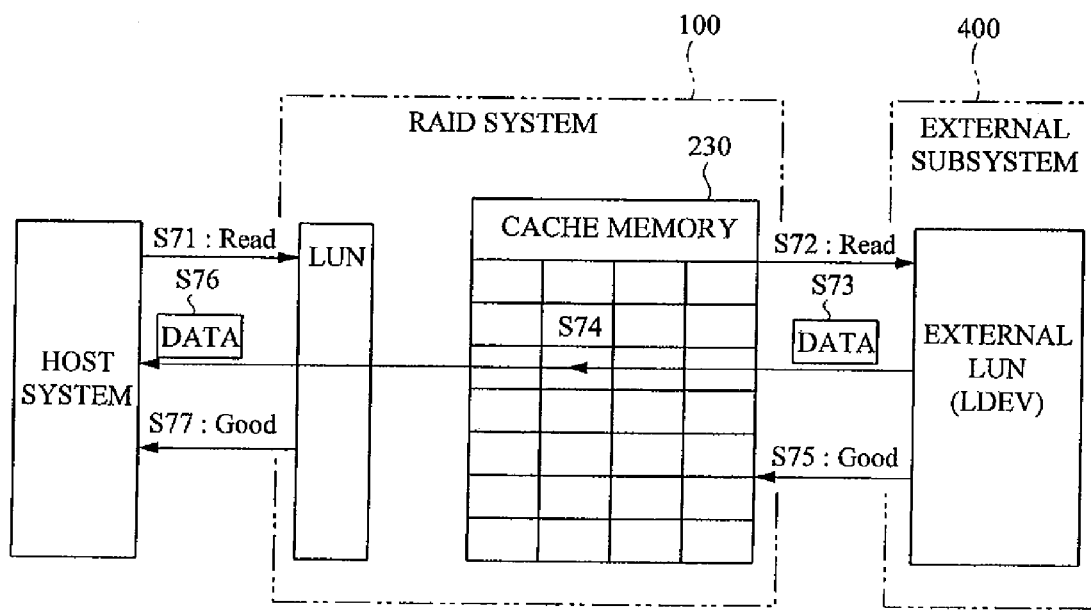

An example of the operation for reading data from the external subsystem will be described with reference to FIG. 19. FIG. 19 is an explanatory diagram showing the operation for reading data from the external subsystem.

First, the host system specifies a port and sends a data read command to the RAID system 100 (S71). When the RAID system 100 receives the read command, it generates a read command to read a requested data from the external subsystem 400. The RAID system 100 sends the generated read command to the external subsystem 400 (S72). The external subsystem 400 reads the data requested from the storage device 410 in accordance with the read command received from the RAID system 100 and sends it to the RAID system 100 (S73) and notifies that the read operation is completed normally (S75). As shown in FIG. 19(*b*), the RAID system 100 stores the data received from the external subsystem 400 at a predetermined location in the cache memory 230 (S74).

Subsequently, the RAID system 100 reads data stored in the cache memory 230 and converts its address. After that, it transmits the data to the host system through the LUN (S76) and notifies that the read operation is completed (S77).

FIG. 19 shows the case where data is read from the external subsystem 400 in accordance with the request from the host system and stored in the cache memory 230. However, the present invention is not limited to this example, and all or part of data stored in the external LDEV can be stored in the cache memory 230 in advance. In this case, it is possible to read data from the cache memory 230 immediately in response to a read command from the host system and send it to the host system.

<Structure of Principal Parts of Another Data Processing System>

Figure 20:
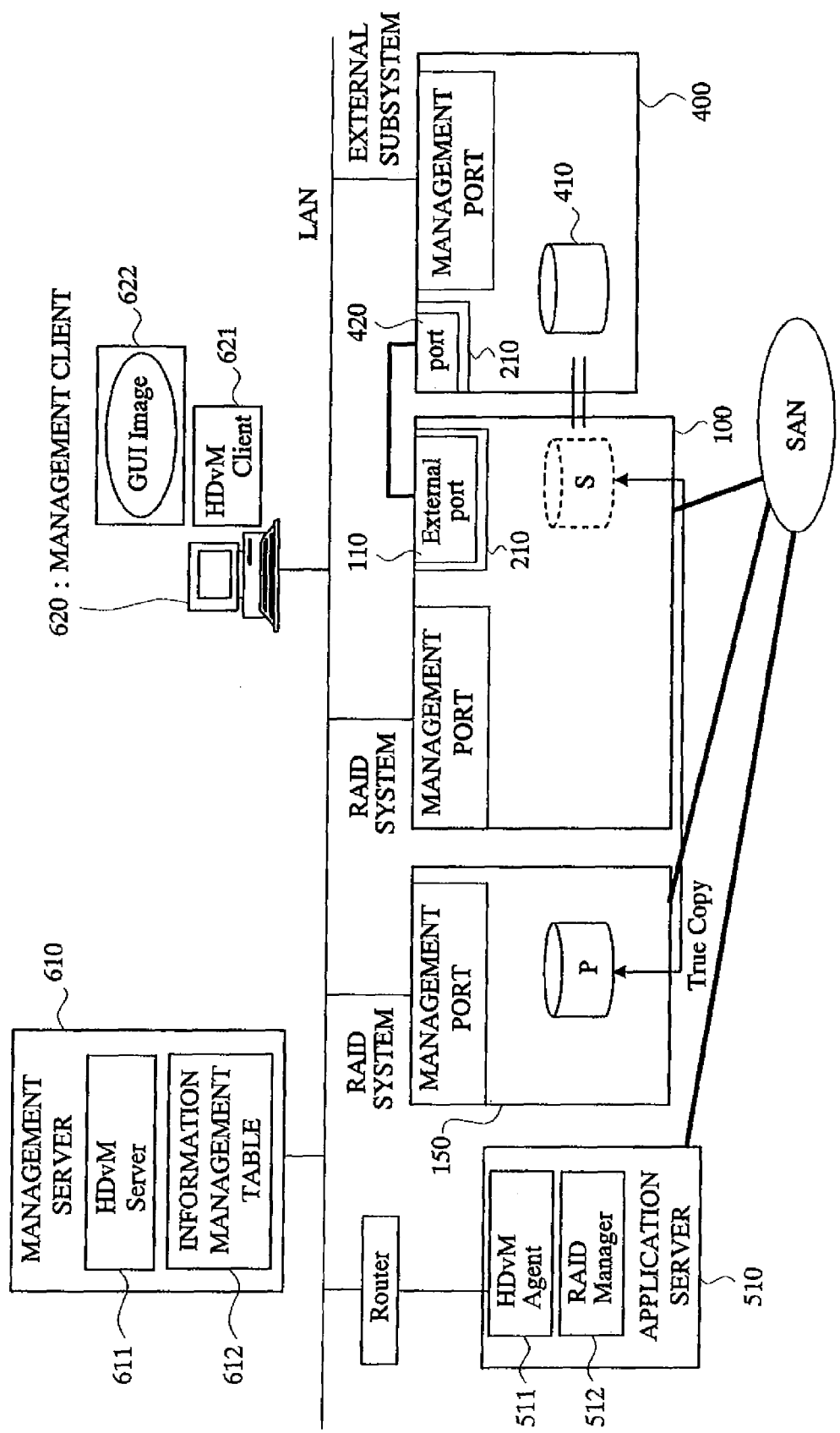
FIG. 20 is a block diagram showing the structure of principal parts in another data processing system according to the embodiment of the present invention.

An example of the structure of principal parts in another data processing system according to an embodiment of the present invention will be described with reference to FIG. 20. FIG. 20 is a block diagram showing the structure of principal parts of another data processing system.

While FIG. 2 shows the system configuration having the copy function called shadow image, the system configuration of another data processing system of this embodiment has a remote data copy function between the storage subsystems, that is, a copy function called true copy, and the RAID system 150 of copy source is added to the RAID system 100 of copy destination.

That is, this data processing system comprises, as shown in FIG. 20, the RAID system 100 which is a first storage system, the external subsystem 400 which is a second storage system, the RAID system 150 which is a third storage system, the application server 510 which is a host system for executing I/O of data between the RAID systems 100 and 150, and the management server 610 and management client 620 which are management units for controlling the configuration information of the RAID systems 100, 150 and the external subsystem 400. The RAID system 100, the RAID system 150, and the application server 510 are communicably connected through the SAN, and the RAID system 100, the RAID system 150, the external subsystem 400, the application server 510, the management server 610, and the management client 620 are communicably connected through the LAN.

According to this data processing system, a backup operating system using a mapped external volume as SVOL of true copy can be established by setting a PVOL of different storage subsystem in the above-described process of selecting a storage subsystem for PVOL (S31) in <Pair Creation Process for PVOL and SVOL (S3)>.

That is, by executing the pair creation process in which the internal LDEV loaded on the RAID system 150 is set as PVOL and the internal LDEV loaded on the RAID system 100 mapped from the external subsystem 400 is set as SVOL, a backup operating system can be established. Because other processes are the same as those in the case of the above-described shadow image, description thereof will be omitted.

As a result, a data processing system using the mapped external volume as SVOL of true copy can be established, and therefore, similar to the case of the shadow image, the high-speed and advanced function possessed by the RAID systems 100 and 150 can be applied to the LU of an inexpensive external subsystem 400.

EFFECT OF EMBODIMENTS (1) When establishing a backup operating system which includes the RAID system 100, the external subsystem 400, the application server 510, the management server 610, and the management client 620 and uses the copy function called shadow image, a high-speed and advanced function possessed by the highly-functional and high-performance RAID system 100 can be achieved in a storage area of an inexpensive external subsystem 400.

(2) When establishing a backup operating system which includes the RAID system 100, the external subsystem 400, the RAID system 150, the application server 510, the management server 610, and the management client 620 and uses the copy function called true copy, a high-speed and advanced function possessed by the highly-functional and high-performance RAID systems 100 and 150 can be achieved in a storage area of an inexpensive external subsystem 400.

(3) As a result of the above (1) and (2), existing system such as the external subsystem can be used effectively, and thus, the cost of the entire system can be reduced.

In the foregoing, the invention made by the inventor of the present invention has been concretely described based on the embodiments. However, it is needless to say that the present invention is not limited to the foregoing embodiments and various modifications and alterations can be made within the scope of the present invention.

I claim:
1. A storage system comprising:
a first control unit;
at least one first storage device;
at least one first port to be coupled to a computer;
at least one second port to be coupled to an external storage system comprising at least one second storage device and a second control unit providing an external logical volume by the at least one second storage device;
wherein the first control unit is configured to:
manage a first volume, wherein a write data to the first volume is stored in a storage area in the at least one first storage device in the storage system,
manage a second volume, wherein a write data to the second volume is stored in a storage area, which is mapped to the second volume, of the at least one second storage device which provides the external logical volume,
create a copy pair between the first volume and the second volume which are selected from a list of volumes provided by the first control unit with information of either the at least one first storage device or the at least one second storage device as a storage device in which the data of each of the volumes is stored, and
operate a copy function between the first volume and the second volume to copy data between the at least one first storage device and the at least one second storage device.

2. A storage system according to claim 1:
wherein the first control unit is configured to:
copy data stored in the storage area in the first volume provided by the at least one first storage device in the first storage system to the storage area in the external logical volume provided by the at least one second storage device in the external storage system by operating the copy function between the first volume and the second volume in the storage system.

3. A storage system according to claim 1:
wherein the second volume is a virtual volume which is mapped to the storage area in the external logical volume provided by the second control unit in the external storage system.

4. A storage system according to claim 1:
the first control unit is configured to:
copy data stored in the storage area in the external volume provided by the second control unit in the external storage system to the storage area in the first volume provided by the at least one first storage device by operating the copy function between the first volume and the second volume.

5. A storage system according to claim 1:
wherein the location information displayed indicates whether data written to each of the plurality of volumes is to be stored in the at least one first storage device in the storage system or the external storage system coupled to the second port.

6. A storage system according to claim 1:
wherein the location information for the plurality of volumes indicates whether the data written to each of the plurality of volumes is to be stored in the at least one first storage device or the external storage system coupled to the second port.

7. A storage system coupled to a computer comprising:
a first control unit;
at least one first storage device;
at least one port to be coupled to an external storage system comprising a second control unit and at least one second storage device;
wherein the first control unit is configured to:
manage a first volume and a second volume,
create a copy pair between the first volume and the second volume which are selected from a list of volumes provided by the first control unit with information of either the at least one first storage device or the at least one second storage device as a storage device in which data of each of the volumes is stored, and
operate a copy function between the first volume and the second volume, so that data is copied between a storage area in the at least one first storage device and a storage area in the at least one second storage device in the external storage system.

8. A method for a storage system which includes a first control unit, at least one first storage device, at least one first port to be coupled to a computer, and at least one second port to be coupled to an external storage system comprising at least one second storage device and a second control unit providing an external logical volume by the at least one second storage device, the method comprising:
managing, by the first control unit, a first volume, where write data to the first volume is stored in a storage area in the at least one first storage device in the storage system;

managing, by the first control unit, a second volume, where write data to the second volume is stored in a storage area, which is mapped to the second volume, of the at least one second storage device which provides the external logical volume;

creating, by the first control unit, a copy pair between the first volume and the second volume which are selected from a list of volumes provided by the first control unit with information of either the at least one first storage device or the at least one second storage device as a storage device in which the data of each of the volumes is stored; and operating, by the first control unit, a copy function between the first volume and the second volume to copy data between the at least one first storage device and the at least one second storage device.

9. A method according to claim 8, further comprising:
copying data, by the first control unit, stored in the storage area in the first volume provided by the at least one first storage device in the first storage system to the storage area in the external logical volume provided by the at least one second storage device in the external storage system by operating the copy function between the first volume and the second volume in the storage system.

10. A method according to claim 8:
wherein the second volume is a virtual volume which is mapped to the storage area in the external logical volume provided by the second control unit in the external storage system.

11. A method according to claim 8, further comprising:
copying data, by the first control unit, stored in the storage area in the external volume provided by the second control unit in the external storage system to the storage area in the first volume provided by the at least one first storage device by operating the copy function between the first volume and the second volume.

12. A method according to claim 8:
wherein the location information displayed indicates whether data written to each of the plurality of volumes is to be stored in the at least one first storage device in the storage system or the external storage system coupled to the second port.

13. A method according to claim 8:
wherein the location information for the plurality of volumes indicates whether the data written to each of the plurality of volumes is to be stored in the at least one first storage device or the external storage system coupled to the second port.

14. A method for storage system which is coupled to a computer, the storage system including a first control unit, at least one first storage device, and at least one port to be coupled to an external storage system including a second control unit and at least one second storage device, the method comprising:
managing, by the first control unit, a first volume and a second volume;

create a copy pair between the first volume and the second volume which are selected from a list of volumes provided by the first control unit with information of either the at least one first storage device or the at least one second storage device as a storage device in which the data of each of the volumes is stored; and operating, by the first control unit, a copy function between the first volume and the second volume, so that data is copied between a storage area in the at least one first storage device and a storage area in the at least one second storage device in the external storage system.

* * * * *